United States Patent
Takamatsu et al.

(10) Patent No.: US 11,615,476 B2
(45) Date of Patent: Mar. 28, 2023

(54) INFORMATION PROCESSING DEVICE AND METHOD

(71) Applicant: SONY CORPORATION, Tokyo (JP)

(72) Inventors: Shingo Takamatsu, Tokyo (JP); Naoki Ide, Tokyo (JP); Akira Fukui, Kanagawa (JP); Yasufumi Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 233 days.

(21) Appl. No.: 16/469,296

(22) PCT Filed: Dec. 8, 2017

(86) PCT No.: PCT/JP2017/044111
§ 371 (c)(1),
(2) Date: Jun. 13, 2019

(87) PCT Pub. No.: WO2018/116862
PCT Pub. Date: Jun. 28, 2018

(65) Prior Publication Data
US 2020/0005399 A1    Jan. 2, 2020

(30) Foreign Application Priority Data

Dec. 22, 2016  (JP) .............................. JP2016-248799

(51) Int. Cl.
*G06Q 40/08* (2012.01)
*B60W 40/09* (2012.01)
*G06N 5/04* (2023.01)

(52) U.S. Cl.
CPC ............. *G06Q 40/08* (2013.01); *B60W 40/09* (2013.01); *G06N 5/04* (2013.01)

(58) Field of Classification Search
CPC ...................................................... G06Q 40/08
(Continued)

(56) References Cited

U.S. PATENT DOCUMENTS 9,454,786 B1     9/2016  Srey et al.
10,445,758 B1 * 10/2019  Bryer ..................... G06Q 40/08
(Continued)

FOREIGN PATENT DOCUMENTS

JP    2002-149984 A    5/2002
JP    2004-102801 A    4/2004
(Continued)

OTHER PUBLICATIONS

International Search Report and Written Opinion of PCT Application No. PCT/JP2017/044111, dated Jan. 23, 2018, 09 pages of ISRWO.

(Continued)

*Primary Examiner* — Hao Fu
(74) *Attorney, Agent, or Firm* — Chip Law Group

(57) ABSTRACT

The present technology relates to an information processing device, an information processing method, that facilitate comparisons between insurances. The information processing device includes an acquisition unit that acquires an output from one sensor or outputs from a plurality of sensors different from each other as behavior-monitoring data items of a user, and a diagnosis-result prediction unit that predicts a diagnosis result about one insurance or diagnosis results about a plurality of insurances for the user on the basis of a prediction model calculated in advance by learning for the one insurance or each of the plurality of insurances and on the basis of the behavior-monitoring data items. The present technology is applicable to comparison systems.

17 Claims, 24 Drawing Sheets

(58) Field of Classification Search
USPC .............................................................. 705/4
See application file for complete search history.

(56) References Cited

U.S. PATENT DOCUMENTS

| | | | |
|---|---|---|---|
| 2008/0255888 A1 | 10/2008 | Berkobin et al. | |
| 2012/0010906 A1 | 1/2012 | Foladare et al. | |
| 2013/0190967 A1* | 7/2013 | Hassib | G07C 5/0858 |
| | | | 701/31.5 |
| 2014/0142989 A1* | 5/2014 | Grosso | G06Q 40/00 |
| | | | 705/4 |
| 2015/0193885 A1* | 7/2015 | Akiva | G07C 5/0841 |
| | | | 705/4 |
| 2016/0055540 A1* | 2/2016 | Chan | G06Q 30/0277 |
| | | | 705/14.66 |
| 2016/0357187 A1 | 12/2016 | Ansari | |
| 2016/0364678 A1 | 12/2016 | Cao | |
| 2018/0175790 A1* | 6/2018 | Sanfilippo | H02J 3/383 |

FOREIGN PATENT DOCUMENTS

| | | |
|---|---|---|
| JP | 2006-039642 A | 2/2006 |
| JP | 2015-207186 A | 11/2015 |
| JP | 2016-194821 A | 11/2016 |
| WO | 03/065261 A1 | 8/2003 |
| WO | 2003/065261 A1 | 8/2003 |

OTHER PUBLICATIONS

Office Action for JP Patent Application No. 2018-557671, dated Sep. 7, 2021, 3 pages of Office Action and 3 pages of English Translation.

Office Action for JP Patent Application No. 2018-557671, dated Mar. 1, 2022, 04 pages of English Translation and 03 pages of Office Action.

* cited by examiner

| | Estimated diagnosis result of your driving | Discount | Discounted monthly premium |
|---|---|---|---|
| Telematics insurance company A | 85 points | \800/mon | \3,200/mon |
| Telematics insurance company B | ☆☆☆★ | \400/mon | \3,400/mon |
| ... | ... | ... | ... |

FIG.9

|  | Estimated diagnosis result of your driving | Discount |
|---|---|---|
| Telematics insurance company A | 85±7 points ☆☆☆☆★ ☆★★★★ ☆☆☆☆★ | ¥800±¥100/mon |
| Telematics insurance company B | | ¥400±¥200/mon |
| ... | | ... |

FIG.15

INFORMATION PROCESSING DEVICE AND METHOD

CROSS REFERENCE TO RELATED APPLICATIONS

This application is a U.S. National Phase of International Patent Application No. PCT/JP2017/044111 filed on Dec. 8, 2017, which claims priority benefit of Japanese Patent Application No. JP 2016-248799 filed in the Japan Patent Office on Dec. 22, 2016. Each of the above-referenced applications is hereby incorporated herein by reference in its entirety.

TECHNICAL FIELD

The present technology relates to an information processing device, an information processing method, and a program. More specifically, the present technology relates to an information processing device, an information processing method, and a program that facilitate comparisons between insurances.

BACKGROUND ART

For example, when a user thinks of applying for an insurance, in many cases, the user compares insurances provided by a plurality of insurance companies to each other, and selects one that the user himself/herself thinks optimum.

In such a case, the user may use, for example, an insurance comparison website. In the insurance comparison website, the user inputs information items of his/her own. With this, the user can compare insurances of the same type, which are provided by the plurality of insurance companies, to each other in a list. In this way, the user can easily select suited one of the insurances.

In this context, an insurance called a telematics insurance has been known as one type of an automobile insurance.

The telematics insurance refers to an insurance including monitoring behaviors of an automobile to be driven by the user with a plurality of sensors, and determining a discount of a premium in accordance with a drive diagnosis result based on the monitoring. For example, as the number of behaviors such as sudden acceleration, which are liable to cause an accident, becomes smaller, the drive diagnosis result to be obtained becomes better, and the discount is increased.

Further, as a technology for detecting the behaviors of the automobile so as to diagnose driving characteristics of a driver, for example, a technology for calculating an acceleration of the automobile with use of a mobile terminal device has been proposed (refer, for example, to Patent Literature 1).

CITATION LIST

Patent Literature

Patent Literature 1: Japanese Patent Application Laid-open No. 2015-207186

DISCLOSURE OF INVENTION

Technical Problem

As described above, the telematics insurance refers to the insurance including determining the discount of the premium by monitoring the behaviors of the automobile to be driven by the user.

Thus, at a time of comparing the plurality of telematics insurances to each other, the discounts cannot be calculated only by inputting the information items about the user in the insurance comparison website. For this reason, the comparison cannot be made.

In other words, in order to compare such telematics insurances to each other, the user needs to check the drive diagnosis results and the discounts, that is, to apply for the telematics insurances provided by the respective companies, and to actually drive, which requires time and effort.

In view of such circumstances, the present technology has been made to facilitate comparisons between insurances.

Solution to Problem

According to an embodiment of the present technology, there is provided an information processing device including:

an acquisition unit that acquires an output from one sensor or outputs from a plurality of sensors different from each other as behavior-monitoring data items of a user; and a diagnosis-result prediction unit that predicts a diagnosis result about one insurance or diagnosis results about a plurality of insurances for the user on the basis of a prediction model calculated in advance by learning for the one insurance or each of the plurality of insurances, and on the basis of the behavior-monitoring data items.

The information processing device may further include
a display-data generation unit that generates a display data item for presenting
a result of the prediction of the diagnosis result about the one insurance, or results of the predictions of the diagnosis results about the plurality of insurances.

The display-data generation unit may further calculate
a discount or a premium of the one insurance on the basis of the result of the prediction, or
discounts or premiums of the plurality of insurances on the basis of the results of the predictions.

The display data item that the display-data generation unit generates may include a display data item for
presenting, together with the result of the prediction, the discount or the premium of the one insurance, or
presenting, together with the results of the predictions, the discounts or the premiums of the plurality of insurances.

The acquisition unit may acquire, during driving by the user, the output from the one sensor or the outputs from the plurality of sensors different from each other as the behavior-monitoring data items.

The diagnosis-result prediction unit may predict a drive diagnosis result about the one insurance or drive diagnosis results about the plurality of insurances for the user on the basis of the prediction model, and on the basis of the behavior-monitoring data items.

The one insurance or each of the plurality of insurances may be a telematics insurance.

The information processing device may further include
a calculation unit that calculates, on the basis of the behavior-monitoring data items,
a confidence factor or a prediction error of the result of the prediction of the diagnosis result about the one insurance, or
confidence factors or prediction errors of the results of the predictions of the diagnosis results about the plurality of insurances.

The display-data generation unit may generate the display data item in accordance with the confidence factor or the prediction error of the result of the prediction, or in accordance with the confidence factors or the prediction errors of the results of the predictions.

The display data item that the display-data generation unit generates may include a display data item for presenting, together with the result of the prediction, the confidence factor or the prediction error of the result of the prediction, or presenting, together with the results of the predictions, the confidence factors or the prediction errors of the results of the predictions.

The display data item that the display-data generation unit generates may include a display data item for presenting the result of the prediction of the diagnosis result about the one insurance only when the confidence factor is equal to or more than a predetermined value or only when the prediction error is equal to or less than a predetermined value, or presenting the results of the predictions of the diagnosis results about the plurality of insurances only when the confidence factors are each equal to or more than the predetermined value or only when the prediction errors are each equal to or less than the predetermined value.

The information processing device may further include an action recognition unit that performs action recognition with respect to the user on the basis of the output from the one sensor or the outputs from the plurality of sensors different from each other.

The acquisition unit may acquire the behavior-monitoring data items on the basis of a result of the action recognition.

The action recognition unit may recognize, by the action recognition, to which one of a plurality of action statuses including at least riding by the user an action status of the user corresponds.

The acquisition unit may specify an end of the driving by the user on the basis of the result of the action recognition, and may acquire the behavior-monitoring data items in accordance with a result of the specification.

The acquisition unit may specify a start and the end of the driving by the user on the basis of position information items indicating positions of the user, and on the basis of the result of the action recognition, and may acquire the behavior-monitoring data items in accordance with a result of the specification.

The behavior-monitoring data items may include behavior-monitoring data items in a predetermined time period, and behavior-monitoring data items in each interval other than a certain interval in the predetermined time period.

The result of the prediction of the diagnosis result about the one insurance may include a prediction result that is obtained from the behavior-monitoring data items in the predetermined time period, and a prediction result that is obtained from the behavior-monitoring data items in each of the other intervals.

The results of the predictions of the diagnosis results about the plurality of insurances may include prediction results that are obtained from the behavior-monitoring data items in the predetermined time period, and prediction results that are obtained from the behavior-monitoring data items in each of the other intervals.

The diagnosis-result prediction unit may specify the certain interval in which a difference between the prediction result that is obtained from the behavior-monitoring data items in the predetermined time period and the prediction result that is obtained from the behavior-monitoring data items in each of the other intervals is equal to or more than a predetermined value, or in which differences between the prediction results that are obtained from the behavior-monitoring data items in the predetermined time period and the prediction results that are obtained from the behavior-monitoring data items in each of the other intervals are each equal to or more than the predetermined value.

The information processing device may further include a driving-behavior specifying unit that specifies driving behaviors of the user in the certain interval on the basis of the behavior-monitoring data items in the predetermined time period.

The driving behaviors may include sudden braking, sudden acceleration, and sudden steering.

The information processing device may further include a display-data generation unit that generates a display data item for presenting the driving behaviors in the certain interval.

The display data item that the display-data generation unit generates may include a display data item for presenting one of the driving behaviors, the one being exhibited a largest number of times in the certain interval.

The one sensor may be an acceleration sensor, a gyroscopic sensor, a barometric sensor, or a geomagnetic sensor.

The plurality of sensors may include the acceleration sensor, the gyroscopic sensor, the barometric sensor, and the geomagnetic sensor.

According to another embodiment of the present technology, there is provided an information processing method or a program, the information processing method or the program including the steps of:

acquiring an output from one sensor or outputs from a plurality of sensors different from each other as behavior-monitoring data items of a user; and predicting a diagnosis result about one insurance or diagnosis results about a plurality of insurances for the user on the basis of a prediction model calculated in advance by learning for the one insurance or each of the plurality of insurances, and on the basis of the behavior-monitoring data items.

According to still another embodiment of the present technology, an output from one sensor or outputs from a plurality of sensors different from each other are acquired as behavior-monitoring data items of a user, and a diagnosis result about one insurance or diagnosis results about a plurality of insurances for the user are predicted on the basis of a prediction model calculated in advance by learning for the one insurance or each of the plurality of insurances, and on the basis of the behavior-monitoring data items.

Advantageous Effects of Invention

According to the embodiments of the present technology, the comparisons between insurances can be facilitated.

Note that, the advantages disclosed herein are not necessarily limited to those described hereinabove, and all the advantages described hereinabove and hereinbelow can be obtained.

BRIEF DESCRIPTION OF DRAWINGS

FIG. 9 A table showing an example of an insurance comparison screen.

FIG. 15 A table showing another example of the insurance comparison screen.

MODE(S) FOR CARRYING OUT THE INVENTION

Now, with reference to the drawings, embodiments to which the present technology is applied are described.

First Embodiment

<Present Technology>

The present technology has been made to facilitate comparisons between insurances provided by predicting drive diagnosis results to be provided by a plurality of drive diagnosis systems that perform drive diagnoses on the basis of outputs from a sensor group, the prediction being performed with use of a sensor group that is not necessarily the same as the sensor group that the plurality of drive diagnosis systems use.

Note that, the drive diagnosis results refer to information items indicating, for example, a degree of safe driving by a driver. In what type of information, such as scores or ranks indicating the degree of safe driving, the drive diagnosis results are provided may be different from drive diagnosis system to drive diagnosis system.

Further, the drive diagnosis systems that perform the drive diagnoses are used when insurance companies provide telematics insurances, and the sensor group to be used may be different from drive diagnosis system to drive diagnosis system. In addition, as the sensor group to be used in the predictions of the drive diagnosis results to be provided by the drive diagnosis systems, there may be used a sensor group installed in a mobile device that the driver carries at a time of driving an automobile, that is, a mobile terminal device.

When the drive diagnosis results to be provided by the drive diagnosis systems of the insurance companies are predicted in this way, discounts of premiums can be calculated from results of the predictions. With this, the comparisons between the insurances can be facilitated.

Further, at the times of presenting the prediction results of the drive diagnosis results and the discounts, monthly premiums and discounted monthly premiums may be presented, the monthly premiums being calculated also with use of, for example, attribute information items of the driver, the discounted monthly premiums being calculated from the obtained monthly premiums and the obtained discounts.

In this way, according to the present technology, without applying for the plurality of telematics insurances provided by the insurance companies, the telematics insurances can be easily compared to each other.

Note that, the insurances to which the present technology is applied are not limited to the telematics insurances for vehicles such as a passenger car and a motorcycle. The present technology is applicable to insurances of any type, such as a health insurance, a medical insurance, and a life insurance, which acquires information items about a user via the mobile terminal device or the like, and which determines the premiums on the basis of the obtained information items. Hereinbelow, an example of a case of the telematics insurances is further described.

Figure 1:
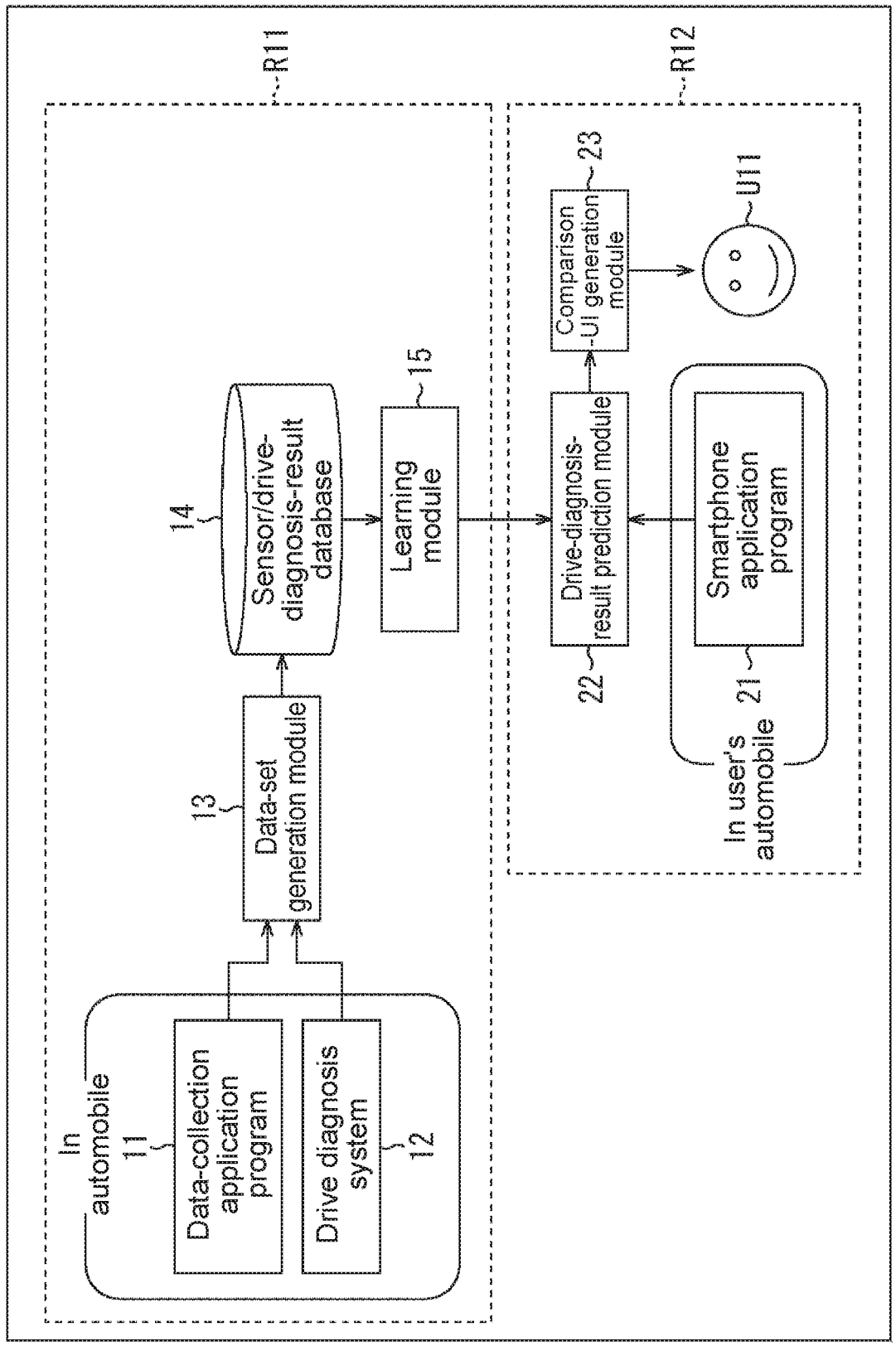
FIG. 1 An explanatory diagram of a comparison system.

First, with reference to FIG. 1, a summary of a comparison system for the telematics insurances, to which the present technology is applied, is described.

In the comparison system shown in FIG. 1, in response to outputs from a sensor group installed in a smartphone as the mobile terminal device, telematics insurances provided by a plurality of insurance companies are compared to each other.

Specifically, in FIG. 1, a part surrounded by a dotted frame R11 corresponds to a configuration for performing collection of data sets and executing a learning procedure, and a part surrounded by a dotted frame R12 corresponds to a configuration for executing processes at a time when a user U11 actually uses the comparison system.

In other words, by the configuration of the part in the frame R11, the data sets of learning data items to be used in the learning procedure are collected, and the learning procedure is executed with use of these obtained data sets.

In the learning procedure, drive-diagnosis-result prediction models for predicting results of drive diagnoses by drive diagnosis systems of the telematics insurances provided by the insurance companies are calculated by learning.

Specifically, in the frame R11, as components of the comparison systems, a data-collection application program 11, a drive diagnosis system 12, a data-set generation module 13, a sensor/drive-diagnosis-result database 14, and a learning module 15 are shown.

The data-collection application program 11 is, for example, an application program that is installed in a smartphone of an administrator of the comparison system, and that provides the drive-diagnosis-result prediction models. Further, the drive diagnosis system 12 is, for example, a system that is implemented by a program that performs the drive diagnoses on the basis of behaviors of a driver during driving, the program being provided from the insurance company after the driver actually applies for the telematics insurance.

For example, the administrator actually applies for the telematics insurances provided by the plurality of insurance companies. Then, the administrator installs, for example, the programs of the drive diagnosis systems 12, which are provided by the insurance companies, into the smartphone of his/her own, or installs these programs to devices such as a car navigation system installed in an automobile.

Note that, by which of the devices such as the device installed in the smartphone or in the automobile the drive diagnosis system 12 is implemented is different from insurance company to insurance company. It is assumed herein that the program for implementing the drive diagnosis system 12 is installed in the smartphone of the administrator.

Further, the administrator installs the data-collection application program 11 in advance in the smartphone of his/her own.

Next, the administrator drives the automobile while carrying the smartphone. With this, the data-collection application program 11 starts to acquire outputs from one or a plurality of sensors installed in the smartphone as behavior-monitoring data items that indicate the behaviors of the administrator being the driver, and continues to acquire (collect) the behavior-monitoring data items until the administrator ends driving.

Similarly, when the driving is started, the drive diagnosis system 12 also acquires the outputs from the one or the plurality of sensors installed in the smartphone. Then, when the driving is ended, the drive diagnosis system 12 performs the drive diagnoses of the administrator on the basis of the outputs from the sensors, which are acquired during the driving.

Note that, processes (diagnoses) to be executed as the drive diagnoses by the drive diagnosis system 12 are different from telematics insurance to telematics insurance. As examples of the results of the drive diagnoses, which are different from telematics insurance to telematics insurance, there may be mentioned a score indicating the degree of safe driving, and a result of rating on a scale of 1 to 5, which indicates the degree of safe driving.

Further, the one sensor or combinations of the plurality of sensors, from which the data items to be used in the drive diagnoses by the drive diagnosis system 12 are acquired, may be the same as or different from the one sensor or combinations of the plurality of sensors, from which the behavior-monitoring data items are acquired. In addition, the data items to be used in the drive diagnoses need not necessarily be acquired from the sensors of the smartphone. In other words, the data items to be used in the drive diagnoses may be acquired, for example, from a system installed in the automobile.

Note that, although the behavior-monitoring data items and the drive diagnosis results are acquired from the administrator who has actually applied for the telematics insurances in the example described herein, the behavior-monitoring data items and the drive diagnosis results may be provided from an arbitrary user other than the administrator.

When the administrator ends the driving, the data-set generation module 13 acquires the behavior-monitoring data items from the data-collection application program 11, and acquires the drive diagnosis results from the drive diagnosis system 12.

Then, the data-set generation module 13 associates the behavior-monitoring data items and the drive diagnosis results obtained in this way with each other, thereby generating data pairs. Next, the data-set generation module 13 supplies, to the sensor/drive-diagnosis-result database 14, these plurality of data pairs as the data sets to be used as the learning data items.

The data-set generation module 13 generates the data sets by collecting the behavior-monitoring data items and the drive diagnosis results each time the administrator drives, and supplies the data sets to the sensor/drive-diagnosis-result database 14.

The sensor/drive-diagnosis-result database 14 records the data sets supplied from the data-set generation module 13, which are collected respectively for the telematics insurances provided by the insurance companies, and supplies these data sets to the learning module 15 when necessary.

The learning module 15 performs machine learning on the basis of the data sets recorded respectively for the plurality of telematics insurances in the sensor/drive-diagnosis-result database 14, thereby generating the drive-diagnosis-result prediction models. The learning module 15 outputs the drive-diagnosis-result prediction models obtained in this way.

The drive-diagnosis-result prediction model are each a model that receives the behavior-monitoring data items during the driving, predicts the drive diagnosis results to be provided by the drive diagnosis system 12, and outputs results of the predictions.

Generally, it is difficult to grasp what type of data items are used in the drive diagnoses by the drive diagnosis system 12. Further, for example, in a case where the drive diagnosis system 12 performs the drive diagnoses by acquiring the data items from the system of the automobile, it may be difficult to acquire the same data items as those used in the drive diagnosis system 12 at the time when the drive diagnosis results are predicted.

However, in the comparison system, the learning for the drive-diagnosis-result prediction models is performed by using the outputs from the sensors installed in the smartphone as the behavior-monitoring data items. Thus, actual drive-diagnosis results can be predicted on the basis of the outputs from the sensors of the smartphone. With this, the results of the predictions of the drive diagnosis results about each of the telematics insurances can be further easily obtained.

After the drive-diagnosis-result prediction models are obtained by the learning, by the configuration of the units in the dotted frame R11, the telematics insurances for the user U11 are compared to each other.

Specifically, in the frame R12, as components of the comparison system, a smartphone application program 21, a drive-diagnosis-result prediction module 22, and a comparison-UI (User Interface) generation module 23 are shown.

The smartphone application program 21 is, for example, an application program that is installed in a smartphone of the user U11 who uses the comparison system. The smartphone application program 21 is provided to the user U11 from, for example, the administrator of the comparison system.

The drive-diagnosis-result prediction module 22 records the respective drive-diagnosis-result prediction models of the telematics insurances, which are output from the learning module 15.

For example, in order that the user U11 uses the comparison system to compare the telematics insurances to each other, the user U11 drives an automobile while carrying the smartphone as the mobile terminal device in which the smartphone application program 21 has been installed. At this time, in starting driving, the user U11 activates the smartphone application program 21 such that driving behaviors of his/her own are monitored.

When the user U11 starts to drive the automobile, the smartphone application program 21 collects outputs from one or a plurality of sensors installed in the smartphone of the user U11 as behavior-monitoring data items that indicate the behaviors of the driving by the user U11 being the driver.

Then, when the user U11 ends the driving of the automobile, the smartphone application program 21 supplies the behavior-monitoring data items, which are acquired at respective time points from the start to the end of the driving, to the drive-diagnosis-result prediction module 22. The user U11 drives the automobile several times such that the behavior-monitoring data items are collected from the several times of driving.

The drive-diagnosis-result prediction module 22 predicts, respectively for the telematics insurances, the drive diagnosis results on the basis of the recorded drive-diagnosis-result prediction models, and of the behavior-monitoring data items supplied from the smartphone application program 21. Then, the drive-diagnosis-result prediction module 22 supplies these obtained prediction results to the comparison-UI generation module 23.

The prediction results of the drive diagnosis results, which are obtained in the drive-diagnosis-result prediction module 22, are, for example, prediction results of the drive diagnosis results, which are supposed to be output by the drive diagnosis system 12 of an actual insurance company when the user U11 drives in the same manner as that at the time when the behavior-monitoring data items are collected.

The comparison-UI generation module 23 generates a display data item for displaying an insurance comparison screen showing the prediction results of the drive diagnosis results about the telematics insurances on the basis of the prediction results of the drive diagnosis results about the telematics insurances, which are supplied from the drive-diagnosis-result prediction module 22. Further, the comparison-UI generation module 23 causes, for example, the smartphone of the user U11 to display the insurance comparison screen on the basis of the generated display data item as appropriate.

Note that, the insurance comparison screen shows, for example, discounts and the prediction results of the drive diagnosis results for the user U11, which are calculated with regard to each of the telematics insurances. In other words, the discounts, the prediction results of the drive diagnosis results, and the like are presented on the insurance comparison screen. By viewing such an insurance comparison screen, the user U11 can compare the telematics insurances that are provided respectively by the companies to each other, and select one of the telematics insurances, which is suited to himself/herself.

As described above, the comparison system allows the user U11 to check, without actually applying for the telematics insurances, the prediction results of the drive diagnosis results and the discounts in a case where the user U11 himself/herself uses the telematics insurances provided by the insurance companies.

<Configuration Example of Administrator Terminal Device>

Next, the embodiment of the present technology, which is described with reference to FIG. 1, is more specifically described.

It is assumed herein that the comparison system shown in FIG. 1 includes an administrator terminal device that the administrator of the comparison system possesses, and that collects the behavior-monitoring data items and the drive diagnosis results, a server that generates the drive-diagnosis-result prediction models by the machine learning, and a user terminal device that the user who uses the comparison system possesses. These administrator terminal device, server, and user terminal device are information processing devices for carrying out the present technology.

Figure 2:
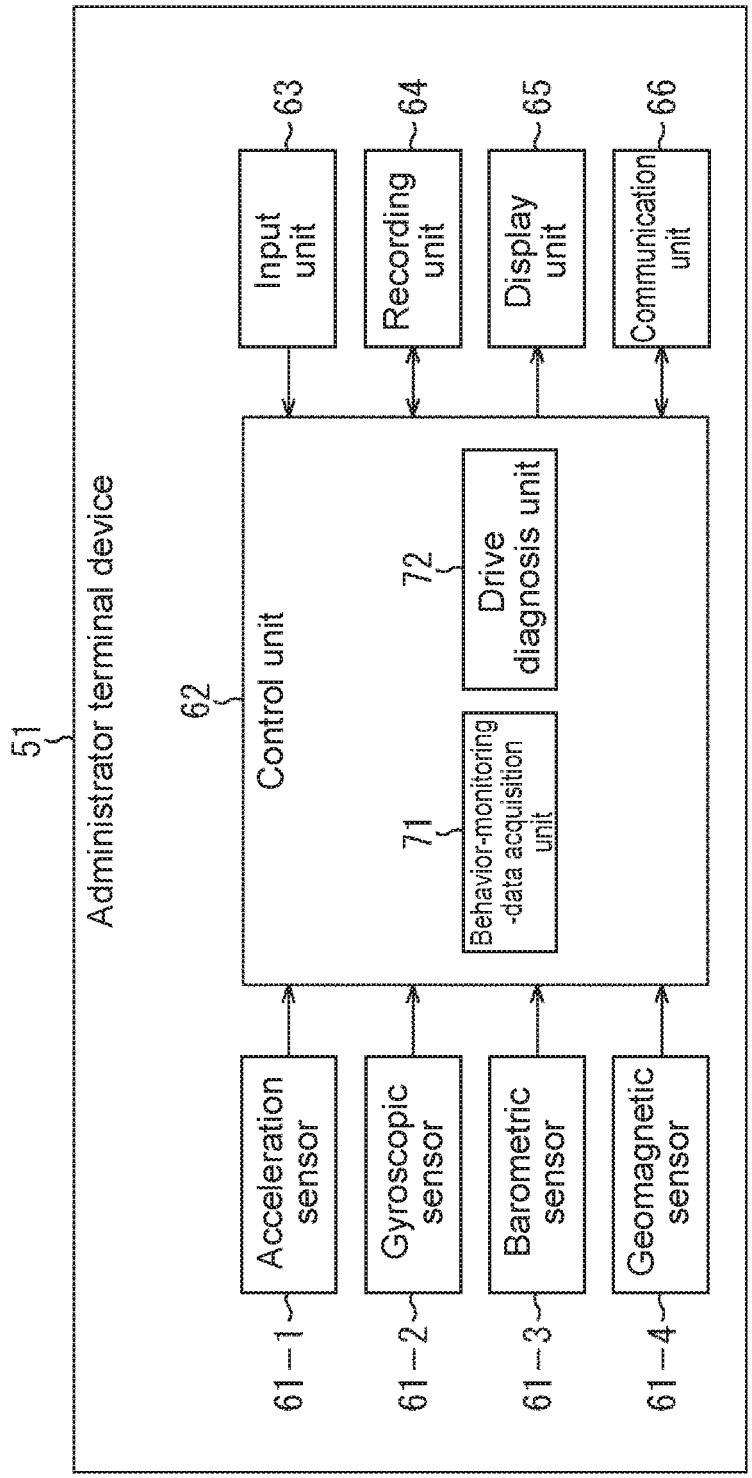
FIG. 2 A diagram showing a configuration example of an administrator terminal device.

In such a case, the administrator terminal device in the comparison system is configured as shown, for example, in FIG. 2. An administrator terminal device 51 shown in FIG. 2 is constituted, for example, by mobile terminal devices such as the smartphone, that is, mobile devices.

The administrator terminal device 51 includes an acceleration sensor 61-1, a gyroscopic sensor 61-2, a barometric sensor 61-3, a geomagnetic sensor 61-4, a control unit 62, an input unit 63, a recording unit 64, a display unit 65, and a communication unit 66.

The acceleration sensor 61-1 measures an acceleration applied to the administrator terminal device 51, and supplies results of the measurement to the control unit 62. The gyroscopic sensor 61-2 measures an angular velocity of the administrator terminal device 51, and supplies results of the measurement to the control unit 62.

The barometric sensor 61-3 measures ambient pressure around the administrator terminal device 51, and supplies results of the measurement to the control unit 62. For example, from variation of the pressure, which is measured by the barometric sensor 61-3, variation in altitude during, for example, moving uphill can be detected. The geomagnetic sensor 61-4 detects (measures) an orientation, and supplies results of the detection to the control unit 62. From the orientation to be obtained from the geomagnetic sensor 61-4, a direction (orientation) in which the administrator terminal device 51 points can be specified.

Note that, hereinbelow, unless the acceleration sensor 61-1 to the geomagnetic sensor 61-4 need to be particularly distinguished from each other, these sensors are also collectively referred as sensors 61.

The control unit 62 controls an overall operation of the administrator terminal device 51. The control unit 62 includes a behavior-monitoring-data acquisition unit 71 and a drive diagnosis unit 72.

The behavior-monitoring-data acquisition unit 71 is activated when the control unit 62 executes the data-collection application program 11 in FIG. 1. The behavior-monitoring-data acquisition unit 71 acquires, as the behavior-monitoring data items, outputs from the sensors 61 during a time period in which the administrator drives the automobile. Although it is assumed herein that, for example, the outputs from all the acceleration sensor 61-1 to the geomagnetic sensor 61-4 are used as the behavior-monitoring data items, there are no problems as long as an output from at least one of the sensors 61 is used as the behavior-monitoring data item.

The drive diagnosis unit 72 corresponds to the drive diagnosis system 12 shown in FIG. 1. The drive diagnosis unit 72 performs the drive diagnoses on the basis of outputs from some of the sensors 61 during the time period in which the administrator drives the automobile.

An algorithm and the like of the drive diagnoses are different from telematics insurance to telematics insurance. For example, which of the outputs from the four sensors 61 is used in the drive diagnoses is different from telematics insurance to telematics insurance. Thus, some of the telematics insurances perform the drive diagnoses with use of only an output from the acceleration sensor 61-1, and other ones of the telematics insurances perform the drive diagnoses with use of the outputs from all the four sensors 61.

The input unit 63, which includes buttons or a touchscreen that is provided in a manner of being superimposed on the display unit 65, supplies signals in response to operations by the administrator to the control unit 62. The recording unit 64 records various data items supplied from the control unit 62, and supplies the data items recorded therein to the control unit 62.

The display unit 65, which includes a liquid-crystal display panel, displays various images supplied from the control unit 62. The communication unit 66 transmits the data items supplied from the control unit 62, or receives data items transmitted thereto and supplies these data items to the control unit 62. For example, the communication unit 66 transmits, to the server, the behavior-monitoring data items and the drive diagnosis results supplied from the control unit 62.

<Configuration Example of Server>

Next, the server constituting the comparison system is described. The server of the comparison system is configured as shown in FIG. 3, for example.

Figure 3:
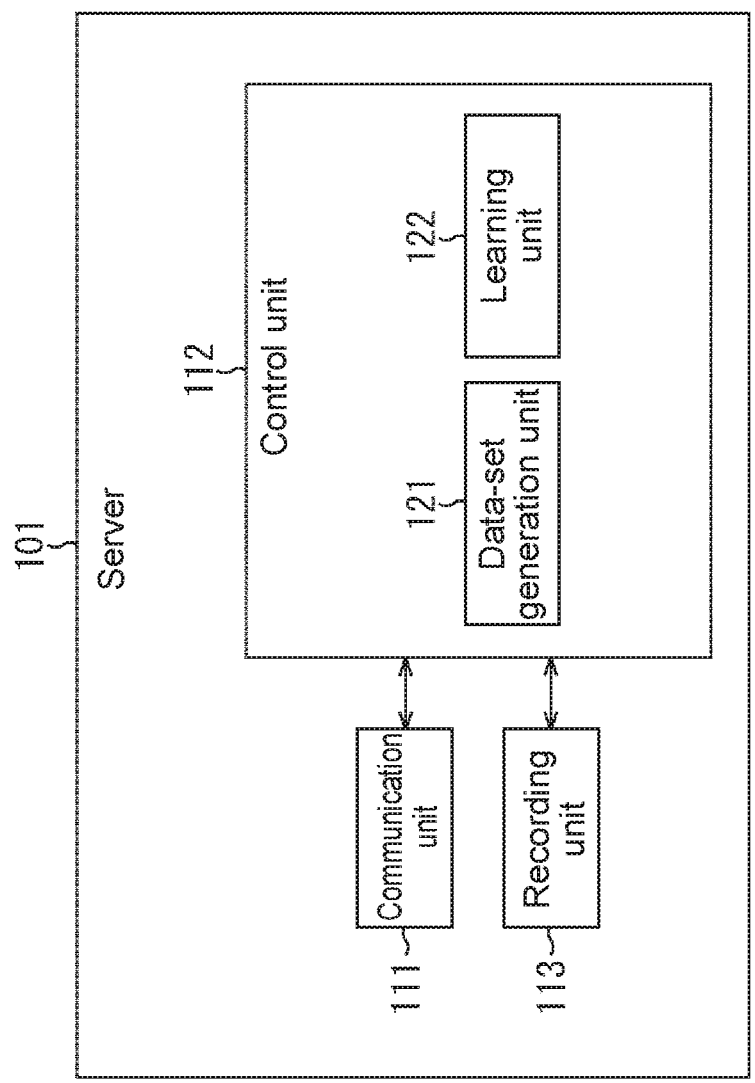
FIG. 3 A diagram showing a configuration example of a server.

A server 101 shown in FIG. 3 includes a communication unit 111, a control unit 112, and a recording unit 113.

The communication unit 111 receives the various data items transmitted from the administrator terminal device 51 and the user terminal device, and supplies these data items to the control unit 112. The communication unit 111 also transmits data items supplied from the control unit 112 to the administrator terminal device 51 and the user terminal device.

The control unit 112 controls an overall operation of the server 101. The control unit 112 includes a data-set generation unit 121 and a learning unit 122.

The data-set generation unit 121, which corresponds to the data-set generation module 13 shown in FIG. 1, associates the behavior-monitoring data items and the drive diagnosis results obtained in the administrator terminal device 51 and supplied therefrom via the communication unit 111 with each other, thereby generating the data pairs. The data-set generation unit 121 supplies these data pairs to the recording unit 113.

Further, the data-set generation unit 121 causes the recording unit 113 to record the plurality of data pairs obtained for each of the telematics insurances as the data sets. Note that, the data-set generation unit 121 may be provided in the control unit 62 of the administrator terminal device 51.

The learning unit 122, which corresponds to the learning module 15 shown in FIG. 1, generates the drive-diagnosis-result prediction models respectively for the telematics insurances by the machine learning with use of the data sets recorded in the recording unit 113.

The recording unit 113, which corresponds, for example, to the sensor/drive-diagnosis-result database 14 shown in FIG. 1, records the various data items such as the data sets supplied from the control unit 112, and supplies the data items recorded therein to the control unit 112.

<Configuration Example of User Terminal Device>

In addition, the user terminal device constituting the comparison system is described. The user terminal device of the comparison system is configured as shown in FIG. 4, for example.

Figure 4:
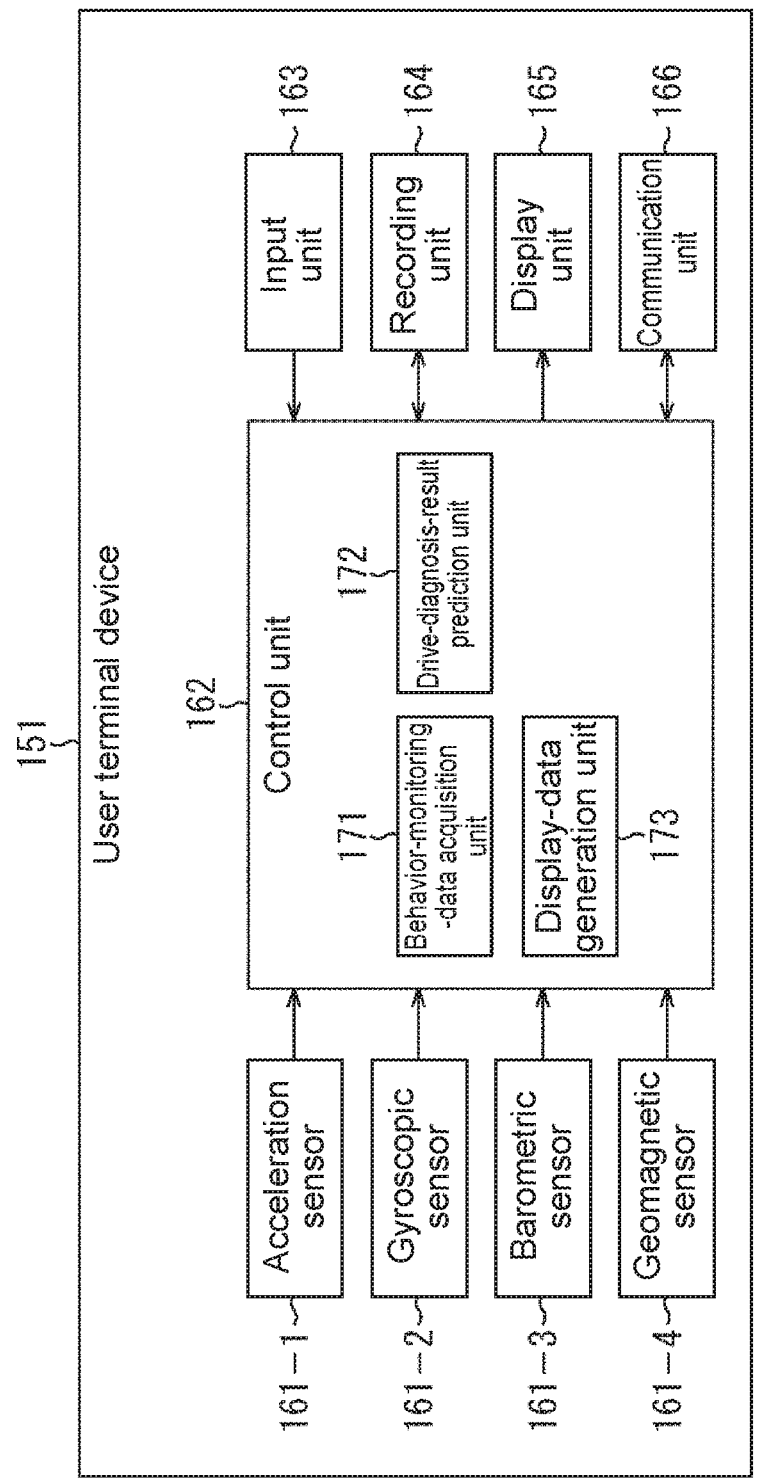
FIG. 4 A diagram showing a configuration example of a user terminal device.

A user terminal device 151 shown in FIG. 4 includes an acceleration sensor 161-1, a gyroscopic sensor 161-2, a barometric sensor 161-3, a geomagnetic sensor 161-4, a control unit 162, an input unit 163, a recording unit 164, a display unit 165, and a communication unit 166.

This user terminal device 151 is constituted, for example, by the mobile terminal devices (mobile devices) that the user can carry, such as the smartphone and a tablet terminal device.

The acceleration sensor 161-1 measures an acceleration applied to the user terminal device 151, and supplies results of the measurement to the control unit 162. The gyroscopic sensor 161-2 measures an angular velocity of the user terminal device 151, and supplies results of the measurement to the control unit 162.

The barometric sensor 161-3 measures ambient pressure around the user terminal device 151, and supplies results of the measurement to the control unit 162. The geomagnetic sensor 161-4 detects (measures) an orientation, and supplies results of the detection to the control unit 162.

Note that, hereinbelow, unless the acceleration sensor 161-1 to the geomagnetic sensor 161-4 need to be particularly distinguished from each other, these sensors are also collectively referred as sensors 161. Note that, these sensors 161 correspond to the sensors 61 provided in the administrator terminal device 51.

The control unit 162 controls an overall operation of the user terminal device 151. The control unit 162 includes a behavior-monitoring-data acquisition unit 171, a drive-diagnosis-result prediction unit 172, and a display-data generation unit 173.

The behavior-monitoring-data acquisition unit 171 is activated when the control unit 162 executes the smartphone application program 21 shown FIG. 1. The behavior-monitoring-data acquisition unit 171 acquires, as behavior-monitoring data items of the user, outputs from the one or plurality of sensors 161 at a time when the user drives the automobile.

Note that, although outputs from all the sensors 161 are acquired as the behavior-monitoring data items in an example described below, outputs from an arbitrary number of the sensors 161 different from each other may be acquired as the behavior-monitoring data items. Note that, it is preferred that ones of the sensors 161, from which the outputs to be acquired as the behavior-monitoring data items are generated, correspond to ones of the sensors 61, which are used for obtaining the behavior-monitoring data items in the administrator terminal device 51.

The drive-diagnosis-result prediction unit 172, which corresponds, for example, to the drive-diagnosis-result prediction module 22 shown in FIG. 1, stores (records) the drive-diagnosis-result prediction model of the one telematics insurance, or the respective drive-diagnosis-result prediction models of the plurality of telematics insurances. The drive-diagnosis-result prediction unit 172 predicts the drive diagnosis results respectively about the telematics insurances on the basis of the drive-diagnosis-result prediction models stored therein, and of the behavior-monitoring data items obtained by the behavior-monitoring-data acquisition unit 171.

The display-data generation unit 173, which corresponds, for example, to the comparison-UI generation module 23 shown in FIG. 1, generates the display data item of the insurance comparison screen on the basis of the prediction results of the drive diagnosis results, which are obtained in the drive-diagnosis-result prediction unit 172.

The input unit 163, which includes buttons or a touch-screen that is provided in a manner of being superimposed on the display unit 165, supplies signals in response to operations by the user to the control unit 162. The recording unit 164 records various data items supplied from the control unit 162, and supplies the data items recorded therein to the control unit 162.

The display unit 165, which includes a liquid-crystal display panel, displays various images supplied from the control unit 162. The communication unit 166 transmits the data items supplied from the control unit 162, or receives data items transmitted thereto and supplies these data items to the control unit 162. For example, the communication unit 166 receives the drive-diagnosis-result prediction models transmitted from the server 101, and supplies these prediction models to the control unit 162.

<Description of Data Collection Procedure And Data Reception Procedure>

Next, a specific operation of the comparison system including the administrator terminal device 51, the server 101, and the user terminal device 151 is described.

First, how the drive-diagnosis-result prediction model of each of the telematics insurances provided by the insurance companies is generated is described.

As described with reference to FIG. 1, the drive diagnosis systems 12 are different from telematics insurance to telematics insurance, and hence the drive-diagnosis-result prediction model is generated for each of the telematics insurances.

Now, how a drive-diagnosis-result prediction model for a telematics insurance provided by a certain insurance company (hereinbelow, also referred to as "company A") is specifically described.

First, the administrator applies for the telematics insurance provided by the company A, and installs the program or the like to the administrator terminal device 51 as appropriate. With this, in the administrator terminal device 51, a drive diagnosis of the telematics insurance provided by the company A can be performed.

Then, the administrator activates the drive diagnosis system 12 and the data-collection application program 11, that is, the drive diagnosis unit 72 and the behavior-monitoring-data acquisition unit 71. In this state, the administrator drives the automobile for a certain time period while carrying the administrator terminal device 51.

Once the administrator starts the driving, the administrator terminal device 51 starts the data collection procedure. Further, when the behavior-monitoring data items and the drive diagnosis results, which are collected by the administrator terminal device 51, are transmitted, the server 101 starts a data reception procedure.

Figure 5:
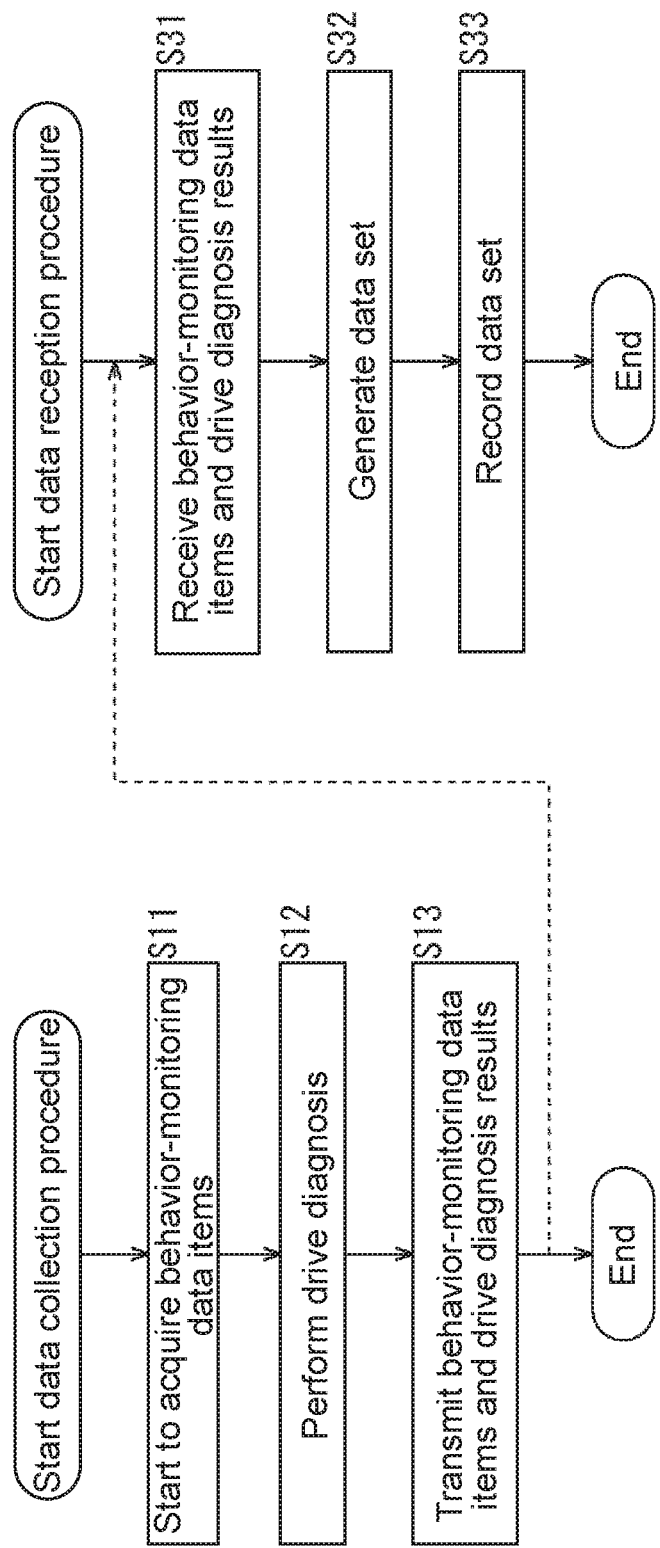
FIG. 5 Explanatory flowcharts showing a data collection procedure and a data reception procedure.

Now, with reference to the flowcharts of FIG. 5, the data collection procedure by the administrator terminal device 51, and the data reception procedure by the server 101 are described.

In Step S11, the behavior-monitoring-data acquisition unit 71 of the administrator terminal device 51 starts to acquire the behavior-monitoring data items, and continues to acquire the behavior-monitoring data items at respective time points during the time period of the driving by the administrator. Specifically, the behavior-monitoring-data acquisition unit 71 acquires the outputs from the acceleration sensor 61-1 to the geomagnetic sensor 61-4 as the behavior-monitoring data items.

Further, when the administrator inputs, for example, by operating the input unit 63, that he/she has ended the driving of the automobile, the behavior-monitoring-data acquisition unit 71 ends the acquisition of the behavior-monitoring data items, and supplies the behavior-monitoring data items obtained during the time period of the driving by the administrator to the communication unit 66.

Similarly, the drive diagnosis unit 72 acquires necessary ones of the outputs from the acceleration sensor 61-1 to the geomagnetic sensor 61-4 during the time period from the start to the end of the driving by the administrator.

Note that, although the drive diagnosis unit 72 acquires the outputs from the sensors 61 as the data items to be used in the drive diagnoses in the description herein, these data items may include data items acquired from the system of the automobile, or both the data items acquired from the system of the automobile and the outputs from the sensors 61.

When the administrator ends the driving, in Step S12, the drive diagnosis unit 72 performs the drive diagnoses of the driving by the administrator on the basis of the outputs from the sensors 61, which are acquired while the administrator is driving the automobile, and supplies obtained drive-diagnosis results to the communication unit 66. With this, drive diagnosis results such as the score indicating the degree of safe driving are obtained.

Note that, more specifically, the outputs from the sensors 61, which are used in the drive diagnoses by the drive diagnosis unit 72, include not only outputs acquired during immediately previous driving by the administrator, but also outputs acquired during further previous driving by the administrator. Thus, for example, the drive diagnosis result about the telematics insurance provided by the company A after first driving and that after second driving may be different from each other.

In Step S13, the communication unit 66 transmits, to the server 101, the behavior-monitoring data items supplied from the behavior-monitoring-data acquisition unit 71, and the drive diagnosis results supplied from the drive diagnosis unit 72. Then, the data collection procedure is ended.

Note that, the behavior-monitoring data items and the drive diagnosis results may be transmitted at once each other, or may be transmitted independently of each other. For example, the behavior-monitoring data items may be transmitted each time and as many as the outputs from the sensors 61 are obtained.

When the process of Step S13 is executed to transmit the behavior-monitoring data items and the drive diagnosis results, the data reception procedure is executed in the server 101.

Specifically, in Step S31, the communication unit 111 receives the behavior-monitoring data items and the drive diagnosis results transmitted from the administrator terminal device 51, and supplies these data items to the control unit 112.

In Step S32, the data-set generation unit 121 generates the data set. Next, in Step S33, the recording unit 113 records the data set generated by the data-set generation unit 121. Then, the data reception procedure is ended.

Specifically, with regard to the telematics insurance provided by the company A, the data-set generation unit 121 reads out previously-obtained behavior-monitoring data items of the administrator, and integrates these read-out behavior-monitoring data items, and the behavior-monitoring data items supplied via the communication unit 111 into a single behavior-monitoring data item.

Further, the data-set generation unit 121 generates the data pair by associating with (linking to) each other the behavior-monitoring data item obtained in this way, and corresponding one of the drive diagnosis results supplied via the communication unit 111. Then, the data-set generation unit 121 integrates a set of data items including this data pair, and previously-obtained data pairs of the telematics insurance provided by the company A, which are recorded in the recording unit 113, with each other into the data set.

In other words, after the data-set generation unit 121 generates the data pairs each including corresponding one of the drive diagnosis results received in Step S31, the data-set generation unit 121 supplies these data pairs to the recording unit 113 such that the recording unit 113 records these data pairs additionally to sets of data items, which have been recorded in the recording unit 113. In this way, the data-set generation unit 121 updates the data set.

In the comparison system, the data collection procedure and the data reception procedure described above are executed a plurality of times with respect to each of the telematics insurances. Further, for example, the administrator who drives the automobile at the time of collecting the behavior-monitoring data items may include a plurality of administrators. In other words, pairs of the behavior-monitoring data items and the drive diagnosis results for each of the plurality of administrators may be generated as the set of data items.

Figure 6:
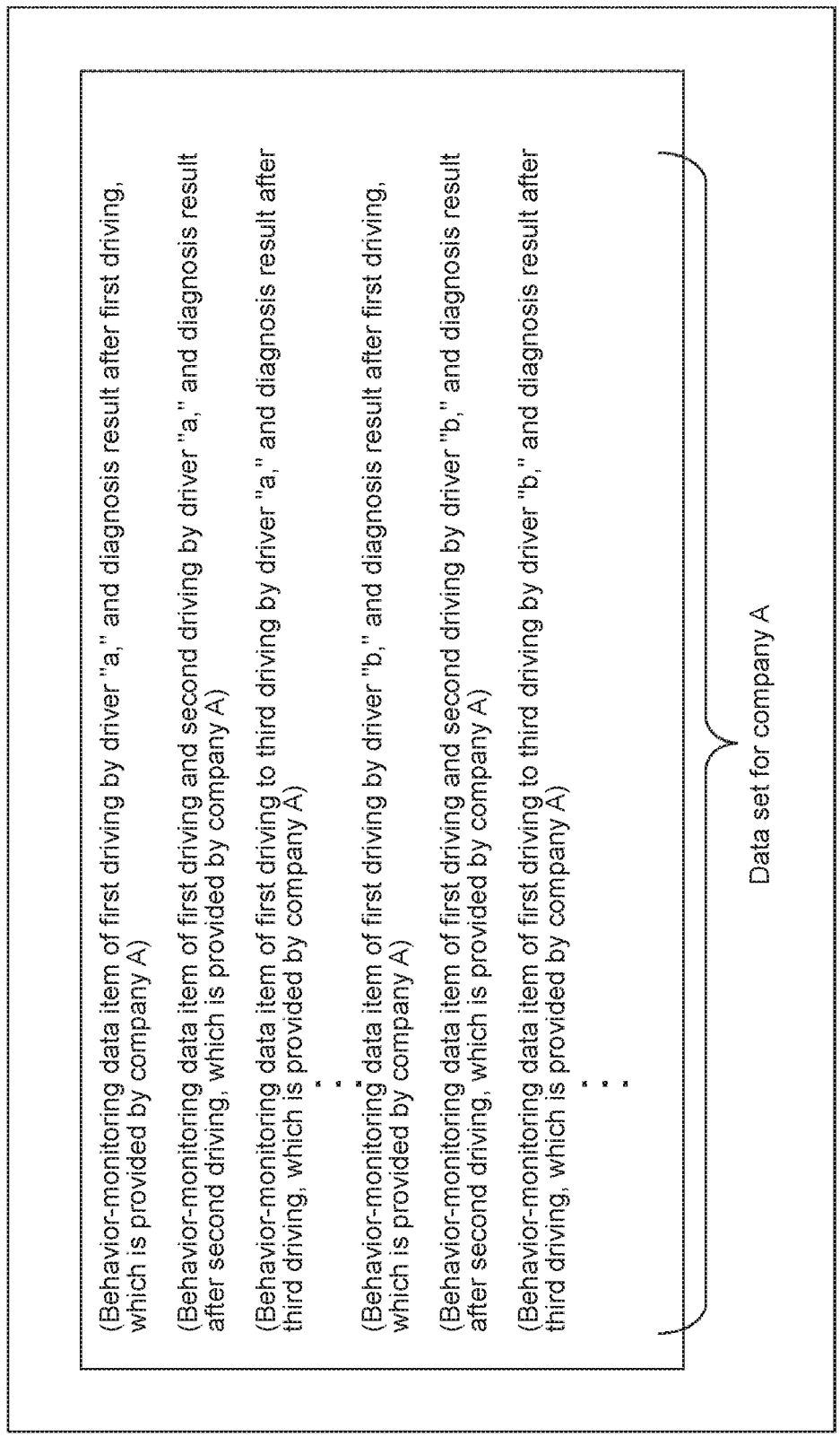
FIG. 6 An explanatory view of a data set.

After the procedures as described above are executed, the data set as shown, for example, in FIG. 6 is recorded in the recording unit 113.

FIG. 6 shows an example of the data set obtained for the telematics insurance provided by the company A.

The data set of this example includes data pairs obtained from a driver "a," and data pairs obtained from a driver "b" other than the driver "a."

Specifically, the data set includes a data pair of a behavior-monitoring data item obtained through first driving by the driver "a" and a drive diagnosis result after the first driving, and a data pair of a behavior-monitoring data item obtained through the first driving and second driving by the driver "a," and a drive diagnosis result after the second driving. Further, the data set also includes a data pair of a behavior-monitoring data item obtained through the first driving to third driving by the driver "a," and a drive diagnosis result after the third driving.

Similarly, the data set also includes data pairs obtained through a plurality of times of driving by the driver "b."

As described above, the administrator terminal device 51 acquires the behavior-monitoring data items during the driving, and performs the drive diagnoses after the driving is ended. Then, the administrator terminal device 51 transmits the behavior-monitoring data items and the drive diagnosis results to the server 101. Further, the server 101 receives the behavior-monitoring data items and the drive diagnosis results, and generates and records the data set. With this, with use of the data set, the drive-diagnosis-result prediction model for predicting the drive diagnosis results from the behavior-monitoring data items can be generated.

<Description of Learning Procedure>

Figure 7:
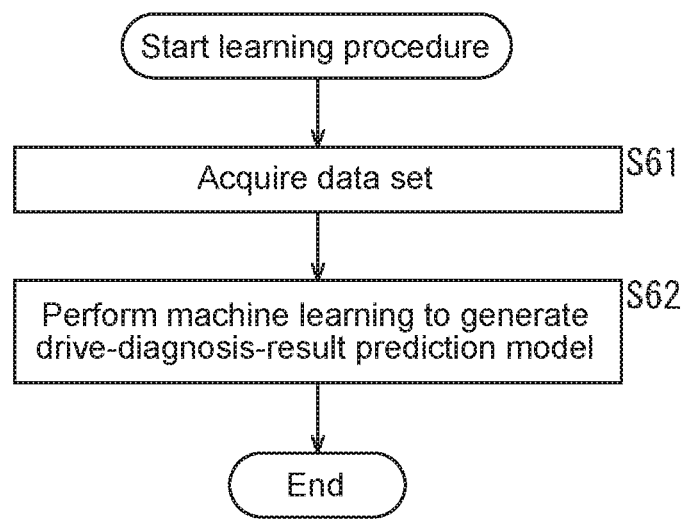
FIG. 7 An explanatory flowchart showing a learning procedure.

When the data set including a sufficient number of data pairs is obtained for the telematics insurance provided by the company A, the server 101 executes the learning procedure on the basis of the data set, thereby generating the drive-diagnosis-result prediction model. Now, with reference to the flowchart of FIG. 7, the learning procedure by the server 101 is described.

In Step S61, the learning unit 122 acquires the data set from the recording unit 113. Specifically, for example, the learning unit 122 reads out the data set of the telematics insurance provided by the company A from the recording unit 113.

In Step S62, the learning unit 122 performs machine learning on the basis of the data set acquired in Step S61 so as to generate a drive-diagnosis-result prediction model for the telematics insurance provided by the company A.

Specifically, at the time of the machine learning, a convolution network is utilized. By learning parameters of the convolution network with use of a gradient method, the drive-diagnosis-result prediction model is generated. More specifically, in the machine learning, parameters of a function to use the behavior-monitoring data items as inputs, and to output the prediction results of the drive diagnosis results are generated as the drive-diagnosis-result prediction model.

The learning unit 122 supplies the drive-diagnosis-result prediction model obtained by the machine learning to the recording unit 113, and causes the recording unit 113 to record the drive-diagnosis-result prediction model. Then, the learning procedure is ended.

As described above, the server 101 generates the drive-diagnosis-result prediction model by performing the machine learning on the basis of the data set. With this, with use of the drive-diagnosis-result prediction model, the drive diagnosis result in a case where a telematics insurance is used can be predicted without actual application for the telematics insurance.

In the administrator terminal device 51 and the server 101, the procedures described above are executed with respect to each of the insurance companies, that is, each of the telematics insurances. With this, the drive-diagnosis-result prediction model is generated for each of the plurality of telematics insurances.

The drive-diagnosis-result prediction models for the telematics insurances, which are generated by the server 101, are provided to the user terminal device 151 in a form of, for example, the application program.

Specifically, for example, the drive-diagnosis-result prediction model is transmitted to the user terminal device 151 via the communication unit 111. In the user terminal device 151, the communication unit 166 receives the drive-diagnosis-result prediction model transmitted from the server 101, and supplies this model to the control unit 162.

Then, the drive-diagnosis-result prediction unit 172 of the control unit 162 stores the drive-diagnosis-result prediction model supplied from the communication unit 166. Note that, the drive-diagnosis-result prediction model may be recorded in advance in the drive-diagnosis-result prediction unit 172 or the recording unit 164, or may be acquired each time when necessary from the server 101.

<Description of Drive-Diagnosis-Result Prediction Procedure>

For example, when the drive-diagnosis-result prediction model is stored in the drive-diagnosis-result prediction unit 172 by some type of method such as installation of an application program including the drive-diagnosis-result prediction model and the smartphone application program 21 to the user terminal device 151, the predictions of the drive diagnosis results and the comparison between the telematics insurances can be performed.

When the user thinks of comparing the telematics insurances to each other, the user operates the input unit 163 so as to activate a dedicated application program including at least the smartphone application program 21.

Then, the user starts to drive the automobile while carrying the user terminal device 151, or with the user terminal device 151 being put in the automobile. When, for example, the dedicated application program is activated, the user terminal device 151 determines that the user has started to drive the automobile. Note that, for example, by operating the input unit 163, the user may input a notification that the user starts the driving to the user terminal device 151.

When the application program is activated in this way, and then when the user starts the driving, the user terminal device 151 starts a drive-diagnosis-result prediction procedure including predicting the drive diagnosis results and displaying the insurance comparison screen.

Figure 8:
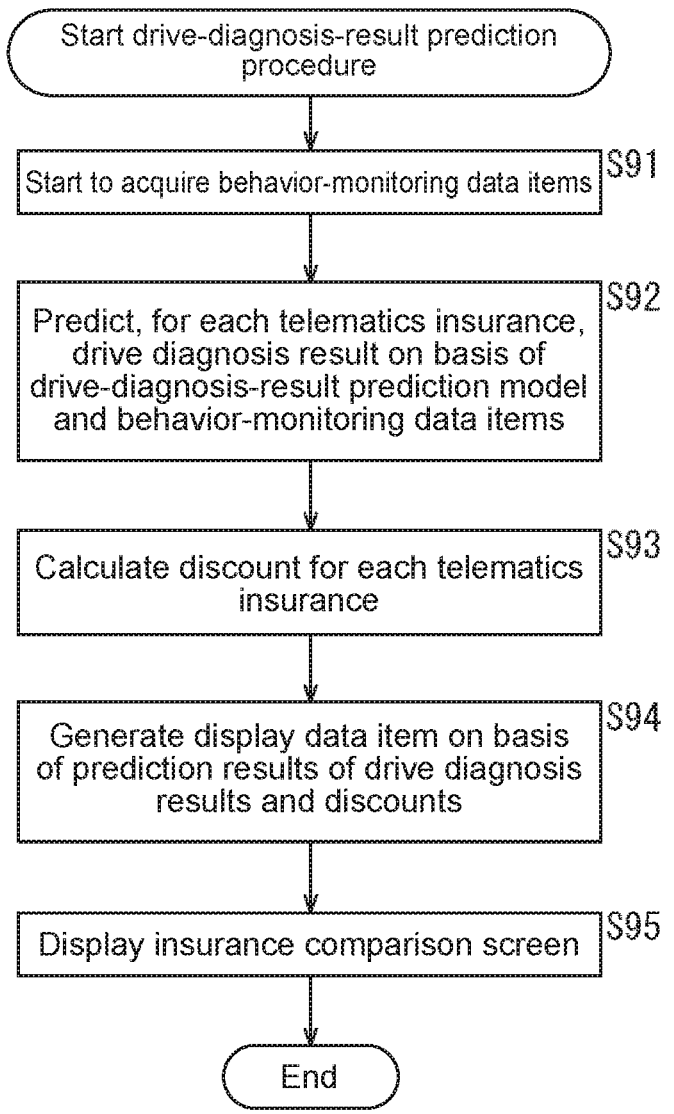
FIG. 8 An explanatory flowchart showing a drive-diagnosis-result prediction procedure.

Now, with reference to the flowchart of FIG. 8, the drive-diagnosis-result prediction procedure to be executed by the user terminal device 151 is described.

In Step S91, the behavior-monitoring-data acquisition unit 171 starts to acquire the behavior-monitoring data items, and continues to acquire the behavior-monitoring data items at respective time points during the time period of the driving by the user. Specifically, the behavior-monitoring-data acquisition unit 171 acquires (collects) the outputs from the acceleration sensor 161-1 to the geomagnetic sensor 161-4 as the behavior-monitoring data items.

Further, for example, when the user ends the driving of the automobile, the user operates the input unit 163 to input a notification that the driving has ended. Then, the behavior-monitoring-data acquisition unit 171 ends the acquisition of the behavior-monitoring data items in response to the signal supplied from the input unit 163 in response to the operation by the user.

The behavior-monitoring data items acquired in Step S91 are supplied as appropriate from the behavior-monitoring-data acquisition unit 171 to the recording unit 164, and recorded therein.

Further, when the user ends the driving, the behavior-monitoring-data acquisition unit 171 reads out, from the recording unit 164, previously-obtained behavior-monitoring data items, that is, all behavior-monitoring data items that are obtained during previous predetermined time periods in which the user drives the automobile. Then, the behavior-monitoring-data acquisition unit 171 integrates these read-out behavior-monitoring data items and the behavior-monitoring data items acquired in Step S91 into a single time-series behavior-monitoring data item, and supplies this integrated data item to the drive-diagnosis-result prediction unit 172.

In Step S92, with regard to each of the telematics insurances, the drive-diagnosis-result prediction unit 172 predicts the drive diagnosis result for the user on the basis of the drive-diagnosis-result prediction model and the behavior-monitoring data item.

Specifically, the drive-diagnosis-result prediction unit 172 calculates the prediction results of the drive diagnosis results for the user on the basis of the behavior-monitoring data items supplied from the behavior-monitoring-data acquisition unit 171, and of the stored drive-diagnosis-result prediction model for the telematics insurance. More specifically, the prediction results of the drive diagnosis results are calculated by substituting the behavior-monitoring data items into the function as the drive-diagnosis-result prediction model.

In Step S93, with regard to each of the telematics insurances, the display-data generation unit 173 calculates, on the basis of the prediction result of the drive diagnosis result, which is obtained by the process of Step S92, the discount that the user is supposed to receive when the user uses the telematics insurance.

Note that, correlations between the drive diagnosis results and the discounts are stored in advance in the display-data generation unit 173.

Further, for example, when attribute information items of the user is recorded in advance in the recording unit 164, or when the attribute information items are input in response to the operation to the input unit 163, on the basis of the discounts and the attribute information items, the display-data generation unit 173 calculates discounted monthly premiums of the telematics insurances.

Herein, the attribute information items refer to information items about the user, such as a vehicle type, a model year, and a mileage of the automobile, which are necessary at a time when the user applies for the telematics insurances. The discounted monthly premiums of the telematics insurances are calculated by subtracting monthly discounts from basic monthly premiums of the user, the basic monthly premiums being calculated from the attribute information items.

In Step S94, the display-data generation unit 173 generates the display data item of the insurance comparison screen on the basis of the prediction results of the drive diagnosis results, which are obtained in Step S92, and on the basis of the discounts calculated in Step S93.

Note that, at the time of generating the display data item, for example, the discounted monthly premiums may be used when necessary. In other words, on the insurance comparison screen, not only the prediction results of the drive diagnosis results and the discounts, but also, for example, the monthly premiums may be displayed (presented).

In Step S95, the display-data generation unit 173 supplies the display data item generated in Step S94 to the display unit 165, and causes the display unit 165 to display the insurance comparison screen.

In this way, the insurance comparison screen as shown in FIG. 9, for example, is displayed on the display unit 165.

The prediction results of the drive diagnosis results for the user, the discounts, and the discounted monthly premiums displayed in the example shown in FIG. 9 are those of the telematics insurances provided by the plurality of insurance companies including the telematics insurance company A and a telematics insurance company B.

For example, with regard to the telematics insurance company A, "85 points" is displayed as the prediction result of the drive diagnosis result, "¥800/mon" is displayed as the discount, and "¥3,200/mon" is displayed as the discounted monthly premium.

In particular, in this example, with regard to the telematics insurance company A, the score indicating the degree of safe driving is obtained to be the prediction result of the drive diagnosis result. In contrast, with regard to the telematics insurance company B, the rating on the scale of 1 to 5, which indicates the degree of safe driving, is obtained to be the prediction result of the drive diagnosis result. In this example, the stars shown in FIG. 9 indicate that 3 on the scale of 1 to 5 has been obtained to be the prediction result of the drive diagnosis result.

By viewing such an insurance comparison screen, the user can compare to each other the telematics insurances provided by the insurance companies, specifically, prediction results of their drive diagnosis results, and their discounted monthly premiums.

When the insurance comparison screen is displayed on the display unit 165, the drive-diagnosis-result prediction procedure is ended.

Note that, although the processes of Step S92 to Step S95 are executed immediately after the process of Step S91 in the case described in this embodiment, the process of Step S91 and the processes of Step S92 to Step S95 may be executed at different timings such as on different days.

As described above, the user terminal device 151 predicts the drive diagnosis results for the user on the basis of the behavior-monitoring data items obtained during the driving, and of the drive-diagnosis-result prediction models, and presents the insurance comparison screen corresponding to the results of the predictions. With this, without actually applying for the telematics insurances provided by the insurance companies, the user can easily compare these insurances to each other.

Modification 1 of First Embodiment

<Another Configuration Example of Server>

In the above-described example, components corresponding to the drive-diagnosis-result prediction module 22 and the comparison-UI generation module 23 shown in FIG. 1, that is, the drive-diagnosis-result prediction unit 172 and the display-data generation unit 173 are provided in the user terminal device 151. However, some or all of these components may be provided on the server 101 side.

Figure 10:
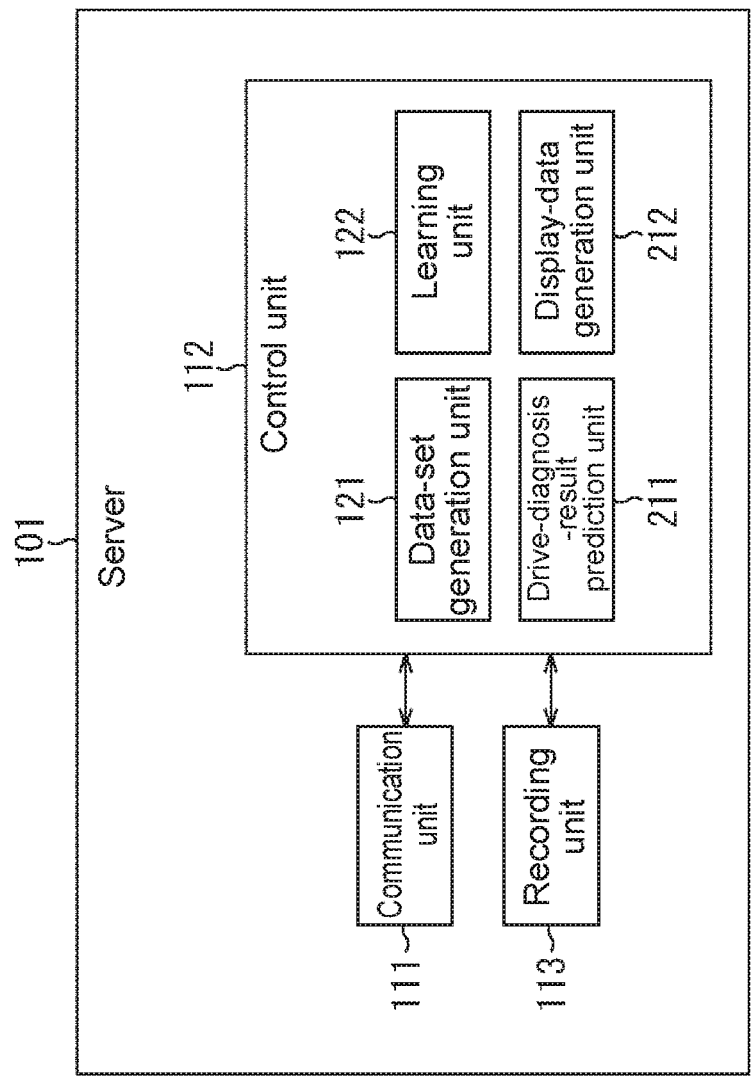
FIG. 10 A diagram showing another configuration example of the server.

For example, when the components corresponding to the drive-diagnosis-result prediction module 22 and the comparison-UI generation module 23 are provided on the server 101 side, the server 101 is configured as shown in FIG. 10. Note that, in FIG. 10, units corresponding to those in the case of FIG. 3 are denoted by the same reference symbols to omit description thereof as appropriate.

The server 101 shown in FIG. 10 includes the communication unit 111, the control unit 112, and the recording unit 113. Specifically, the control unit 112 includes the data-set generation unit 121, the learning unit 122, a drive-diagnosis-result prediction unit 211, and a display-data generation unit 212.

The configuration of the server 101 shown in FIG. 10 is the same as the configuration of the server 101 shown in FIG. 3 except that the control unit 112 further includes the drive-diagnosis-result prediction unit 211 and the display-data generation unit 212.

The drive-diagnosis-result prediction unit 211, which corresponds to the drive-diagnosis-result prediction module 22 shown in FIG. 1, predicts the drive diagnosis results respectively about the telematics insurances on the basis of the drive-diagnosis-result prediction models stored therein, and of the behavior-monitoring data items obtained by the user terminal device 151 and acquired (received) from the user terminal device 151 via the communication unit 111.

The display-data generation unit 212, which corresponds to the comparison-UI generation module 23 shown in FIG. 1, generates the display data item of the insurance comparison screen on the basis of the prediction results of the drive diagnosis results, which are obtained in the drive-diagnosis-result prediction unit 211.

<Another Configuration Example of User Terminal Device>

Figure 11:
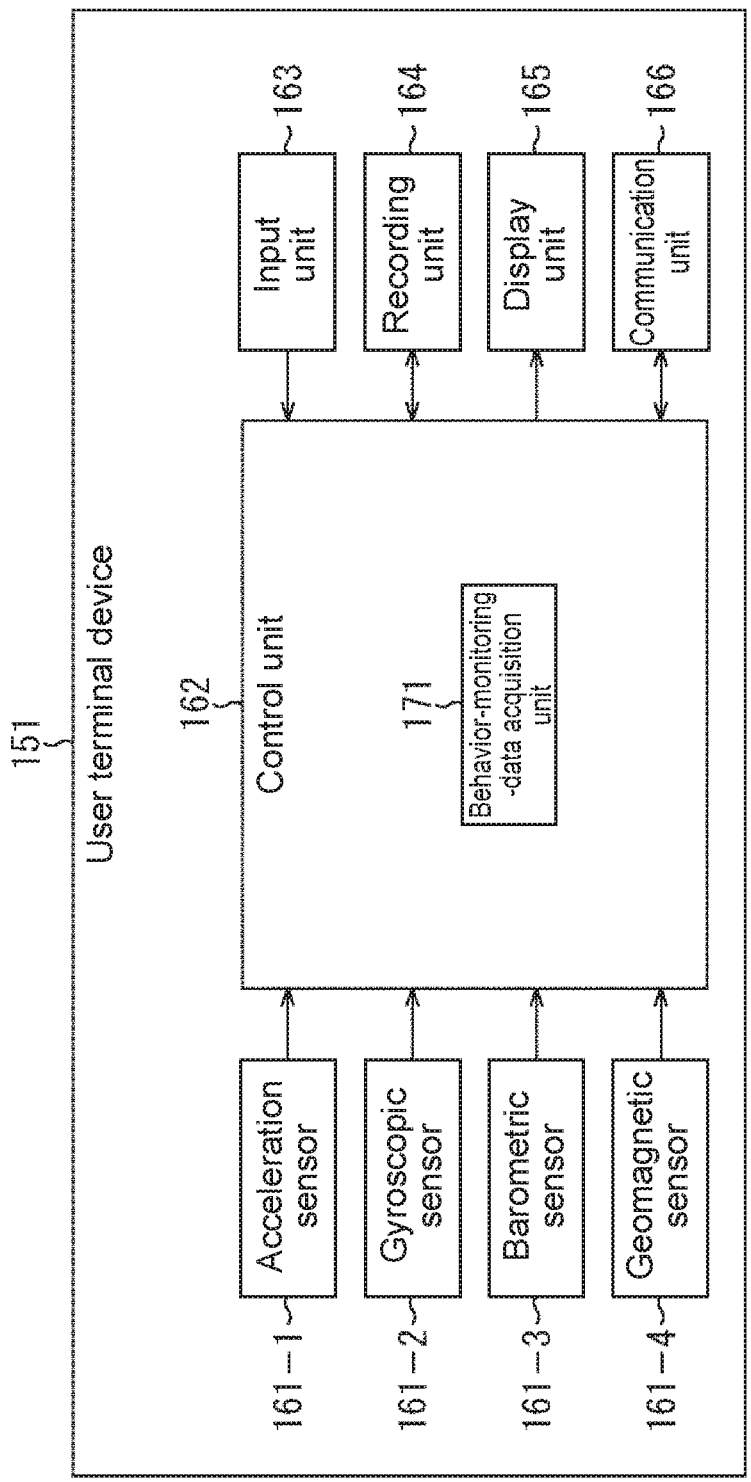
FIG. 11 A diagram showing another configuration example of the user terminal device.

Further, when the server 101 is configured as shown in FIG. 10, the user terminal device 151 is configured as shown in FIG. 11, for example. Note that, in FIG. 11, units corresponding to those in the case of FIG. 4 are denoted by the same reference symbols to omit description thereof as appropriate.

The user terminal device 151 shown in FIG. 11 includes the acceleration sensor 161-1, the gyroscopic sensor 161-2, the barometric sensor 161-3, the geomagnetic sensor 161-4, the control unit 162, the input unit 163, the recording unit 164, the display unit 165, and the communication unit 166.

The configuration of the user terminal device 151 shown in FIG. 11 is the same as the configuration of the user terminal device 151 shown in FIG. 4 except that the control unit 162 does not include the drive-diagnosis-result prediction unit 172 or the display-data generation unit 173.

<Description of Behavior-Monitoring-Data Collection Procedure and Another Drive-Diagnosis-Result Prediction Procedure>

Next, procedures to be executed by the user terminal device 151 shown in FIG. 11 and the server 101 shown in FIG. 10 are described.

Specifically, in the following, with reference to the flowcharts of FIG. 12, a behavior-monitoring-data collection procedure by the user terminal device 151, and another drive-diagnosis-result prediction procedure by the server 101 are described.

In Step S121, the behavior-monitoring-data acquisition unit 171 of the user terminal device 151 starts to acquire the behavior-monitoring data items. In other words, a process to be executed in Step S121 is similar to that of Step S91 in FIG. 8. Further, the behavior-monitoring-data acquisition unit 171 supplies, to the communication unit 166, the behavior-monitoring data items each obtained by integrating the acquired behavior-monitoring data items and the behavior-monitoring data items read out from the recording unit 164 with each other.

In Step S122, the communication unit 166 transmits, to the server 101, the behavior-monitoring data items supplied from the behavior-monitoring-data acquisition unit 171.

Then, in Step S131, the communication unit 111 of the server 101 receives the behavior-monitoring data items transmitted from the user terminal device 151, and supplies these data items to the control unit 112. In other words, the communication unit 111 acquires the behavior-monitoring data items.

In Step S132, with regard to each of the telematics insurances, the drive-diagnosis-result prediction unit 211 predicts the drive diagnosis result for the user on the basis of the drive-diagnosis-result prediction model stored in advance, and of the behavior-monitoring data item supplied via the communication unit 111. In other words, a process to be executed in Step S132 is similar to that of Step S92 in FIG. 8.

In Step S133, with regard to each of the telematics insurances, the display-data generation unit 212 calculates, on the basis of the prediction result of the drive diagnosis result, which is obtained by the process of Step S132, the discount that the user is supposed to receive when the user uses the telematics insurance.

In other words, a process to be executed in Step S133 is similar to that of Step S93 in FIG. 8. Further, when necessary, the display-data generation unit 212 calculates the discounted monthly premiums of the telematics insurances on the basis of the attribute information items of the user. Note that, the attribute information items of the user may be recorded in advance in the recording unit 113, or may be received from the user terminal device 151.

In Step S134, the display-data generation unit 212 generates the display data item of the insurance comparison screen on the basis of the prediction results of the drive diagnosis results, which are obtained in Step S132, and on the basis of the discounts calculated in Step S133. Then, the display-data generation unit 212 supplies this display data item to the communication unit 111. A process to be executed in Step S134 is similar to that of Step S94 in FIG. 8.

In Step S135, the communication unit 111 transmits, to the user terminal device 151, the display data item supplied from the display-data generation unit 212. Then, the other drive-diagnosis-result prediction procedure is ended.

After the display data item is transmitted from the server 101, in Step S123, the communication unit 166 of the user terminal device 151 receives and supplies the transmitted display data item to the control unit 162.

In Step S124, the control unit 162 supplies, to the display unit 165, the display data item from the communication unit 166, and causes the display unit 165 to display the insurance comparison screen. In other words, a process to be executed in Step S124 is similar to that of Step S95 in FIG. 8. After the insurance comparison screen is displayed on the user terminal device 151, the behavior-monitoring-data collection procedure is ended.

As described above, the user terminal device 151 acquires and transmits the behavior-monitoring data items to the server 101, receives the display data item from the server 101, and displays the insurance comparison screen. Further, the server 101 receives the behavior-monitoring data items from the user terminal device 151, predicts the drive diagnosis results on the basis of these behavior-monitoring data items, and generates the display data item.

Also when the server 101 predicts the drive diagnosis results and generates the display data item in this way, the user can easily compare the telematics insurances provided by the insurance companies to each other without actually applying for these insurances.

Second Embodiment

<Still Another Configuration Example of User Terminal Device>

Further, when the user terminal device 151 predicts the drive diagnosis results, as the time periods in which the behavior-monitoring data items are acquired become longer, and as the number of the behavior-monitoring data items to be used in the predictions becomes larger, that is, as the time periods in which the driving behaviors of the user are monitored (driving time period) become longer, accuracy of the predictions tends to be higher. For this reason, at the time of predicting the drive diagnosis results, errors in the predictions may be calculated.

In such a case, for example, after the learning for the drive-diagnosis-result prediction models, the learning unit 122 of the server 101 generates, for each of the telematics insurances, a learning data item for the prediction error, which includes a pair of a length of the driving time period of the user, that is, the time period in which the behavior-monitoring data items are collected (acquired), and the prediction error.

In this case, the prediction error refers to an absolute value of a difference between the drive diagnosis result, which is actually output by the drive diagnosis unit 72 of the administrator terminal device 51, and the prediction result of the drive diagnosis result, which is obtained with use of the drive-diagnosis-result prediction model obtained by the learning. In other words, the prediction error refers to an error of the prediction result of the drive diagnosis result with respect to the actual drive-diagnosis result.

For example, when a score is obtained to be the drive diagnosis result, an absolute value of a difference between the score obtained to be the drive diagnosis result and the score obtained to be the prediction result of the drive diagnosis result is obtained to be the prediction error.

The learning unit 122 generates, for example, respectively for the data pairs included in the data set for each of the telematics insurances, pairs of the driving time period and the prediction error on the basis of the data pairs, and generates a learning data item including the pairs.

Then, on the basis of the obtained learning data item, the learning unit 122 performs machine learning similar to that at the time of the learning for the drive-diagnosis-result prediction model, thereby calculating a prediction-error prediction model being a model for predicting the prediction errors from the driving time periods.

The user terminal device 151 predicts the prediction errors with use of such prediction-error prediction models, and controls the presentation of the insurance comparison screen on the basis of the prediction errors. Specifically, for example, it is possible to calculate, on the basis of the prediction errors, confidence factors indicating probabilities of the prediction results of the drive diagnosis results, thereby presenting the confidence factors together with the prediction results of the drive diagnosis results on the insurance comparison screen, or presenting only ones of the prediction results of the drive diagnosis results, which are with small prediction errors, that is, with high confidence factors, on the insurance comparison screen.

Figure 13:
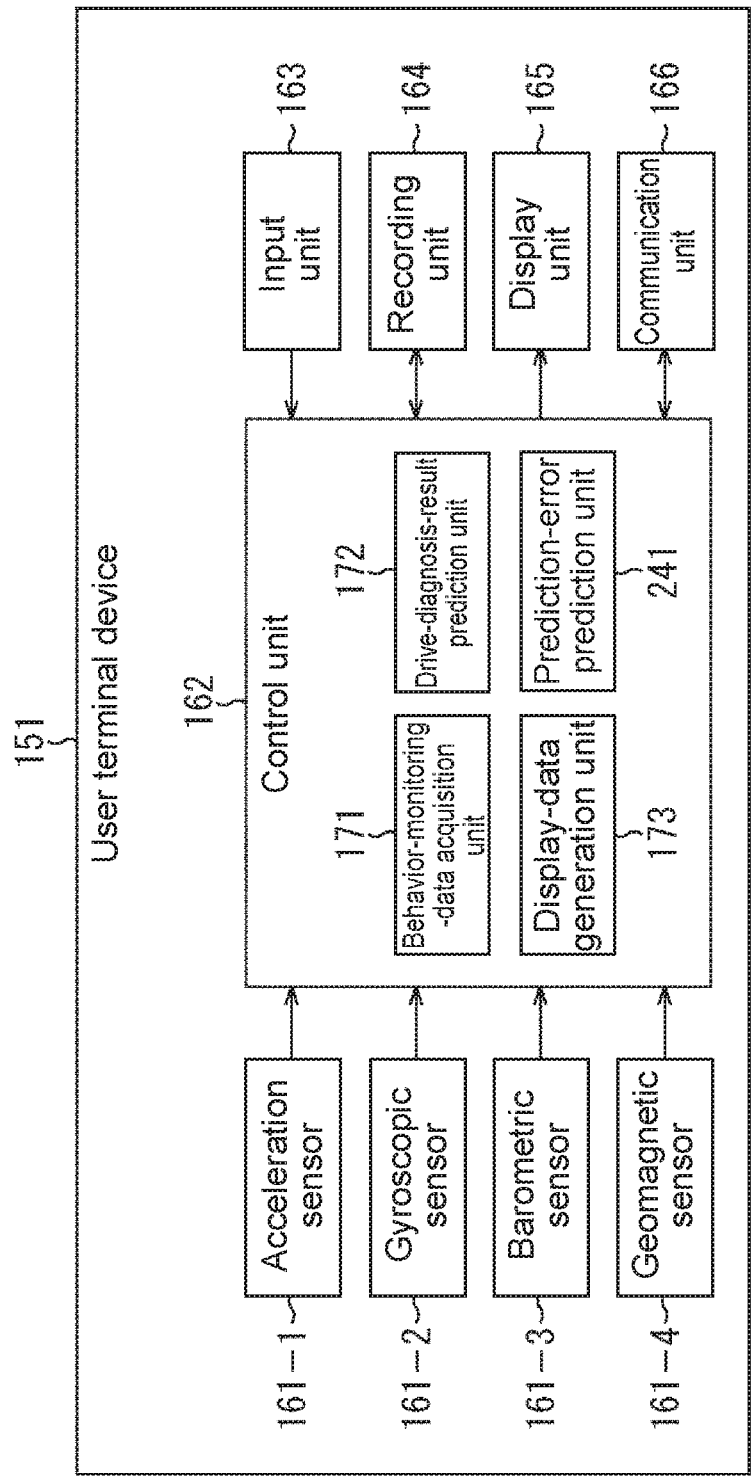
FIG. 13 A diagram showing still another configuration example of the user terminal device.

Specifically, in order that the confidence factors of the prediction results of the drive diagnosis results are calculated, the user terminal device 151 is configured as shown in FIG. 13, for example. Note that, in FIG. 13, units corresponding to those in the case of FIG. 4 are denoted by the same reference symbols to omit description thereof as appropriate.

The user terminal device 151 shown in FIG. 13 includes the acceleration sensor 161-1 to the communication unit 166. Specifically, the control unit 162 includes the behavior-monitoring-data acquisition unit 171, the drive-diagnosis-result prediction unit 172, the display-data generation unit 173, and a prediction-error prediction unit 241.

The configuration of the user terminal device 151 shown in FIG. 13 is the same as the configuration of the user terminal device 151 shown in FIG. 4 except that the control unit 162 further includes the prediction-error prediction unit 241.

The prediction-error prediction unit 241 stores in advance the prediction-error prediction models generated by the learning unit 122 of the server 101. The prediction-error prediction unit 241 predicts the errors in the predictions of the drive diagnosis results from the prediction-error prediction models and the driving time periods being the lengths of the time periods in which the behavior-monitoring data items to be used in the predictions of the drive diagnosis results are collected. Then, the prediction-error prediction unit 271 calculates the confidence factors on the basis of the results of the predictions. In this case, the prediction-error prediction unit 241 functions as a calculation unit that calculates the confidence factors on the basis of the prediction results of the prediction errors.

Herein, examples of the confidence factors include an inverse of the prediction result of the prediction error, which are obtained with use of the prediction-error prediction model. Higher values of the confidence factors indicate smaller prediction errors, that is, higher accuracy of the predictions of the drive diagnosis results.

Note that, although the prediction errors of the drive diagnosis results are predicted with use of the prediction-error prediction models, and the confidence factors are calculated on the basis of the results of the predictions in the example described herein, the confidence factors may be calculated by any other method. For example, as the driving time period becomes longer, the prediction errors tend to become smaller, and the confidence factors tend to become higher. Thus, the confidence factors may be calculated on the basis of the driving time periods. In this case, for example, it is appropriate that the confidence factors to be calculated become higher as the driving time periods become longer.

The display-data generation unit 173 generates the display data item on the basis of the prediction results of the drive diagnosis results, which are obtained in the drive-diagnosis-result prediction unit 172, and on the basis of the confidence factors obtained in the prediction-error prediction unit 241.

<Description of Still Another Drive-Diagnosis-Result Prediction Procedure>

Figure 14:
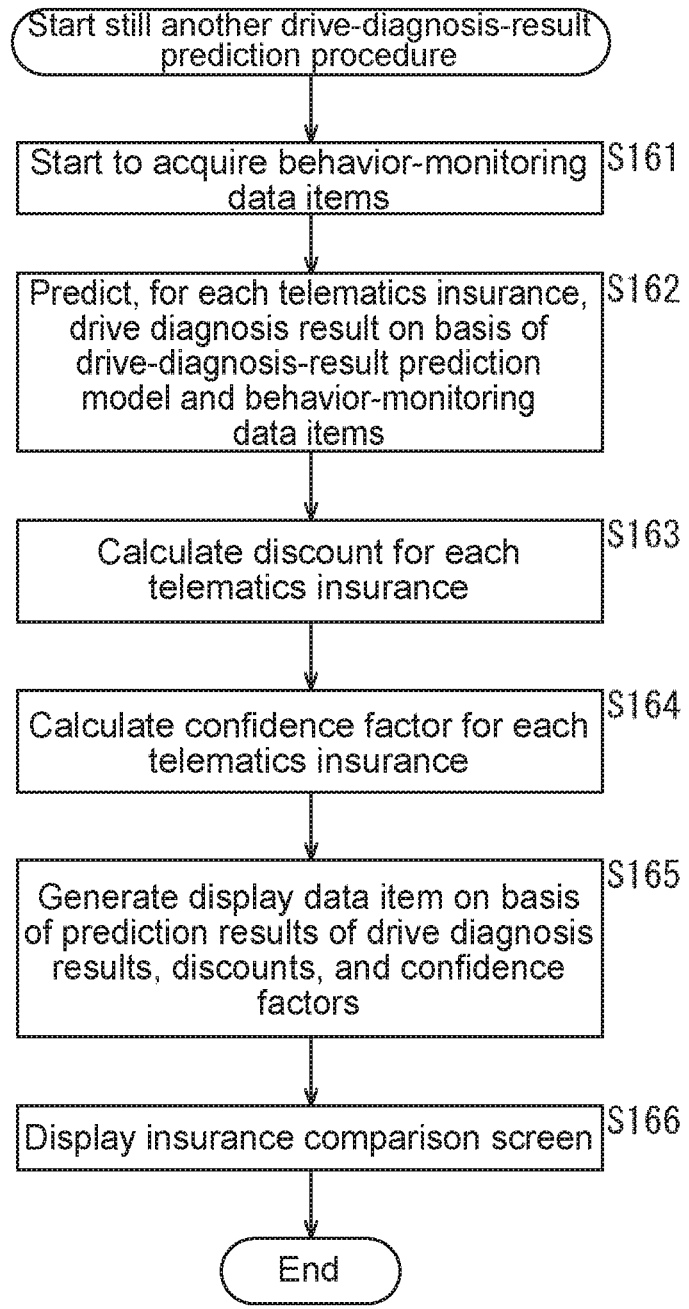
FIG. 14 An explanatory flowchart showing still another drive-diagnosis-result prediction procedure.

Next, with reference to the flowchart of FIG. 14, still another drive-diagnosis-result prediction procedure to be executed when the user terminal device 151 is configured as shown in FIG. 13 is described.

Note that, processes of Step S161 to Step S163 are similar to the processes of Step S91 to Step S93 in FIG. 8, and hence description thereof is omitted.

In Step S164, with regard to each of the telematics insurances, the prediction-error prediction unit 241 calculates the confidence factor of the prediction result of the drive diagnosis result.

Specifically, the prediction-error prediction unit 241 calculates the prediction errors of the prediction results of the drive diagnosis results on the basis of the driving time periods, that is, the lengths of the time periods in which the behavior-monitoring data items used in the predictions of the drive diagnosis results in Step S162 are collected, and on the basis of the prediction-error prediction models stored in advance. Then, the prediction-error prediction unit 241 calculates the inverses of the prediction results of the prediction errors as the confidence factors.

In Step S165, the display-data generation unit 173 generates the display data item of the insurance comparison screen on the basis of the prediction results of the drive diagnosis results, which are obtained in Step S162, on the basis of the discounts calculated in Step S163, and on the basis of the confidence factors obtained in Step S164.

As an example of the display data item to be generated by the display-data generation unit 173, there may be mentioned a display data item for displaying, on the insurance comparison screen, not only the names of the insurance companies, the prediction results of the drive diagnosis results, the discounts, and the discounted monthly premiums, which are shown in FIG. 9, but also the respective confidence factors of the telematics insurances. When the confidence factors are displayed (presented) together on the insurance comparison screen in this way, the user can compare the telematics insurances to each other further precisely.

As another example of the display data item to be generated, there may be mentioned a display data item for displaying, on the insurance comparison screen, the prediction results of the drive diagnosis results, the discounts, the discounted monthly premiums, and the like of only ones of the telematics insurances, for each of which a confidence factor equal to or more than a predetermined threshold has been obtained. In this case, with regard to other ones of the telematics insurances, for each of which a confidence factor less than the threshold has been obtained, that is, the accuracy of the prediction of the drive diagnosis result is insufficient, the information items are not displayed on the insurance comparison screen.

After the display data item is generated, a process of Step S166 is executed. Then, the still other drive-diagnosis-result prediction procedure is ended. The process of Step S166 is similar to the process of Step S95 in FIG. 8, and hence description thereof is omitted.

As described above, the user terminal device 151 calculates not only the prediction results of the drive diagnosis results, but also their confidence factors, and displays the insurance comparison screen in accordance with these prediction results of the drive diagnosis results and these confidence factors. With this, without actually applying for the telematics insurances provided by the insurance companies, the user can easily compare these insurances to each other.

Note that, the insurance comparison screen need not necessarily be displayed in accordance with the prediction results of the drive diagnosis results and the confidence factors as described above in this example, and may be displayed in accordance with the prediction results of the drive diagnosis results and the prediction results of the prediction errors.

In such a case, the display-data generation unit 173 generates a display data item of an insurance comparison screen as shown in FIG. 15, for example.

The prediction results of the drive diagnosis results for the user, the prediction results of the prediction errors, and the discounts displayed on the insurance comparison screen in this example are those of the telematics insurances provided by the plurality of insurance companies including the telematics insurance company A and the telematics insurance company B.

For example, with regard to the telematics insurance company A, "85±7 points" is displayed as both the prediction result of the drive diagnosis result and the prediction result of the prediction error, and "¥800±100/mon" is displayed as the discount.

For example, "85±7 points" represents that the prediction result of the drive diagnosis result is 85 points, and that the prediction result of the prediction error in the prediction of the drive diagnosis result is "±7." Further, with regard to the discount, depending on the prediction error, the discount of "¥800/mon" may include errors of "±¥100/mon."

Similarly, with regard to the telematics insurance company B, the rating on the scale of 1 to 5, which indicates the degree of safe driving, is obtained to be the drive diagnosis result. In this example, the stars shown in FIG. 15 indicate that 3 on the scale of 1 to 5 has been obtained to be the prediction result of the drive diagnosis result. Further, in FIG. 15, stars shown above and below the prediction result of the drive diagnosis result represent that the prediction result of the drive diagnosis result includes rating errors of ±1 stage.

Further, also on the insurance comparison screen that presents the prediction results of the prediction errors, as in the case of the confidence factors, with regard only to ones of the telematics insurances, for each of which a prediction result of a prediction error, which is equal to or less than a predetermined threshold, has been obtained, the prediction results of the drive diagnosis results, the prediction results of the prediction errors, the discounts, and the like may be displayed.

Modification 1 of Second Embodiment

<Still Another Configuration Example of Server>

Further, also when the predictions of the prediction errors are performed with use of the prediction-error prediction models, some or all of the predictions of the drive diagnosis results, the predictions of the prediction errors, and the generation of the display data item may be executed on the server 101 side.

Figure 16:
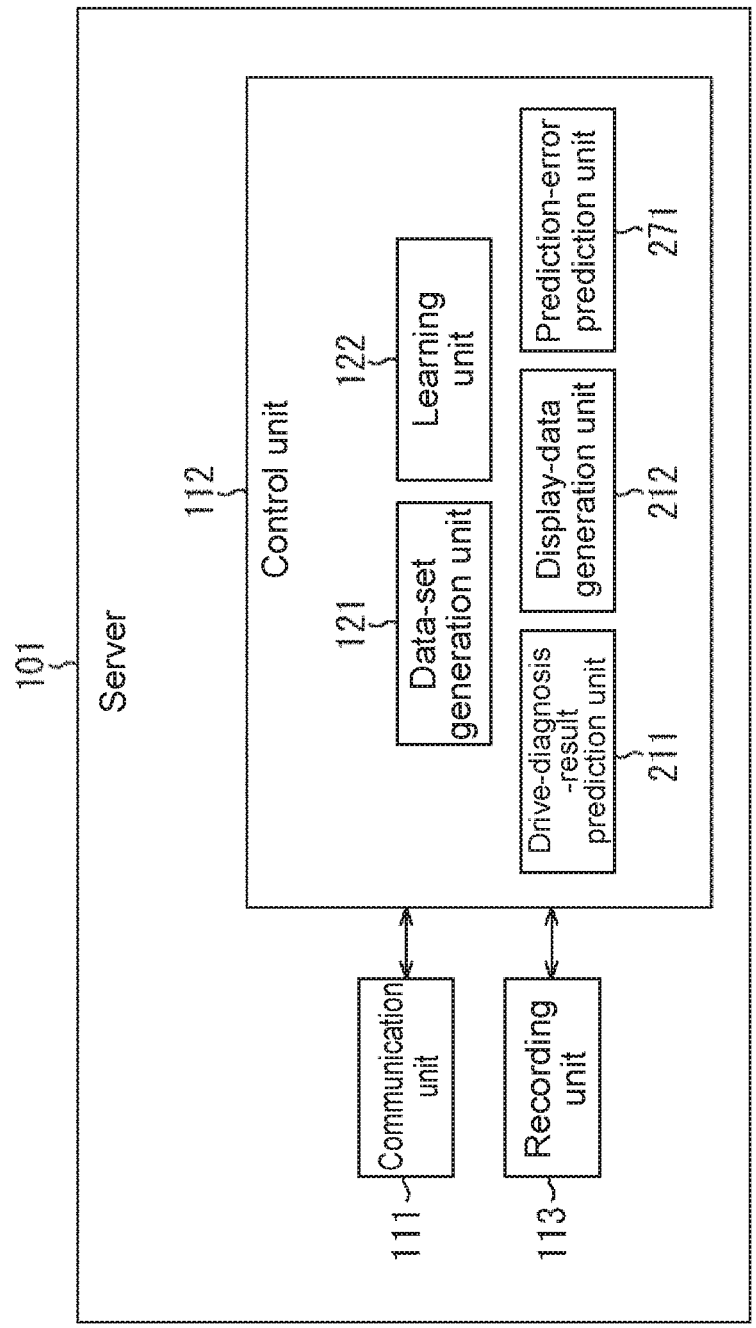
FIG. 16 A diagram showing still another configuration example of the server.

Specifically, when the predictions of the drive diagnosis results, the predictions of the prediction errors, and the generation of the display data item are executed on the server 101 side, the user terminal device 151 is configured as shown in FIG. 11, and the server 101 is configured as shown in FIG. 16. Note that, in FIG. 16, units corresponding to those in the case of FIG. 10 are denoted by the same reference symbols to omit description thereof as appropriate.

The server 101 shown in FIG. 16 includes the communication unit 111, the control unit 112, and the recording unit 113. Specifically, the control unit 112 includes the data-set generation unit 121, the learning unit 122, the drive-diagnosis-result prediction unit 211, the display-data generation unit 212, and a prediction-error prediction unit 271.

In other words, the configuration of the server 101 shown in FIG. 16 is the same as the configuration of the server 101 shown in FIG. 10 except that the control unit 112 further includes the prediction-error prediction unit 271.

The prediction-error prediction unit 271, which corresponds to the prediction-error prediction unit 241 of the user terminal device 151 shown in FIG. 13, stores in advance the prediction-error prediction models generated by the learning unit 122. The prediction-error prediction unit 271 predicts the errors in the predictions of the drive diagnosis results from the prediction-error prediction models and the driving time periods being the lengths of the time periods in which the behavior-monitoring data items to be used in the predictions of the drive diagnosis results are collected. Then, the prediction-error prediction unit 271 calculates the confidence factors on the basis of the results of the predictions.

<Description of Another Behavior-Monitoring-Data Collection Procedure And Yet Another Drive-Diagnosis-Result Prediction Procedure>

Next, procedures to be executed by the user terminal device 151 shown in FIG. 11 and the server 101 shown in FIG. 16 are described.

Specifically, in the following, with reference to the flowcharts of FIG. 17, another behavior-monitoring-data collection procedure by the user terminal device 151, and yet another drive-diagnosis-result prediction procedure by the server 101 are described.

When the behavior-monitoring-data collection procedure is started, processes of Step S191 and Step S192 are executed to transmit the behavior-monitoring data items to the server 101. These processes are similar to the processes of Step S121 and Step S122 in FIG. 12, and hence description thereof is omitted.

Further, when the behavior-monitoring data items are transmitted to the server 101, the yet other drive-diagnosis-result prediction procedure is started. Processes of Step S201 to Step S203 are executed to predict the drive diagnosis results and calculate the discounts. Note that, these processes of Step S201 to Step S203 are similar to the processes of Step S131 to Step S133 in FIG. 12, and hence description thereof is omitted.

In Step S204, with regard to each of the telematics insurances, the prediction-error prediction unit 271 calculates the confidence factor of the prediction result of the drive diagnosis result. In other words, in Step S204, a process similar to that of Step S164 in FIG. 14 is executed.

In Step S205, the display-data generation unit 212 generates the display data item of the insurance comparison screen on the basis of the prediction results of the drive diagnosis results, which are obtained in Step S202, on the basis of the discounts calculated in Step S203, and on the basis of the confidence factors obtained in Step S204. In other words, in Step S205, a process similar to that of Step S165 in FIG. 14 is executed.

After the display data item is generated, a process of Step S206 is executed to transmit the display data item. Then, the yet other drive-diagnosis-result prediction procedure is ended. The process of Step S206 is similar to the process of Step S135 in FIG. 12, and hence description thereof is omitted.

Further, after the display data item is transmitted, in the user terminal device 151, processes of Step S193 and Step S194 are executed. Then, the other behavior-monitoring-data collection procedure is ended. These processes are similar to the processes of Step S123 and Step S124 in FIG. 12, and hence description thereof is omitted.

As described above, the user terminal device 151 acquires and transmits the behavior-monitoring data items to the server 101, receives the display data item from the server 101, and displays the insurance comparison screen. Further, the server 101 receives the behavior-monitoring data items from the user terminal device 151, predicts the drive diagnosis results on the basis of these behavior-monitoring data items, and calculates the confidence factors of the predictions of the drive diagnosis results. Then, the server 101 generates the display data item of the insurance comparison screen in accordance with the prediction results of the drive diagnosis results and the confidence factors.

Also when the server 101 predicts the drive diagnosis results, calculates the confidence factors, and generates the display data item in this way, the user can easily compare the telematics insurances provided by the insurance companies to each other without actually applying for these insurances.

Third Embodiment

<Yet Another Configuration Example of User Terminal Device>

Incidentally, in the embodiments described hereinabove, in order that the user terminal device 151 collects the behavior-monitoring data items while the user is driving the automobile, the user needs to notify the user terminal device 151 of timings when the user starts the driving and ends the driving, for example, by the operation inputs or the activation of the application program. However, such operation inputs at the times of starting the driving and ending the driving require time and effort for the user. In particular, at the time of ending the driving, the user needs to explicitly perform the operation inputs.

In view of such circumstances, in order to reduce a burden on the user at the times of the operation inputs, the end of the driving by the user may be detected, for example, by an action recognition system provided in the user terminal device 151, that is, an action recognition function. In this case, for example, at a time point when an action recognition result other than "Riding in Automobile" starts to be monitored as an action recognition result about the user by the action recognition system, it can be determined that the user has ended the driving of the automobile.

Figure 18:
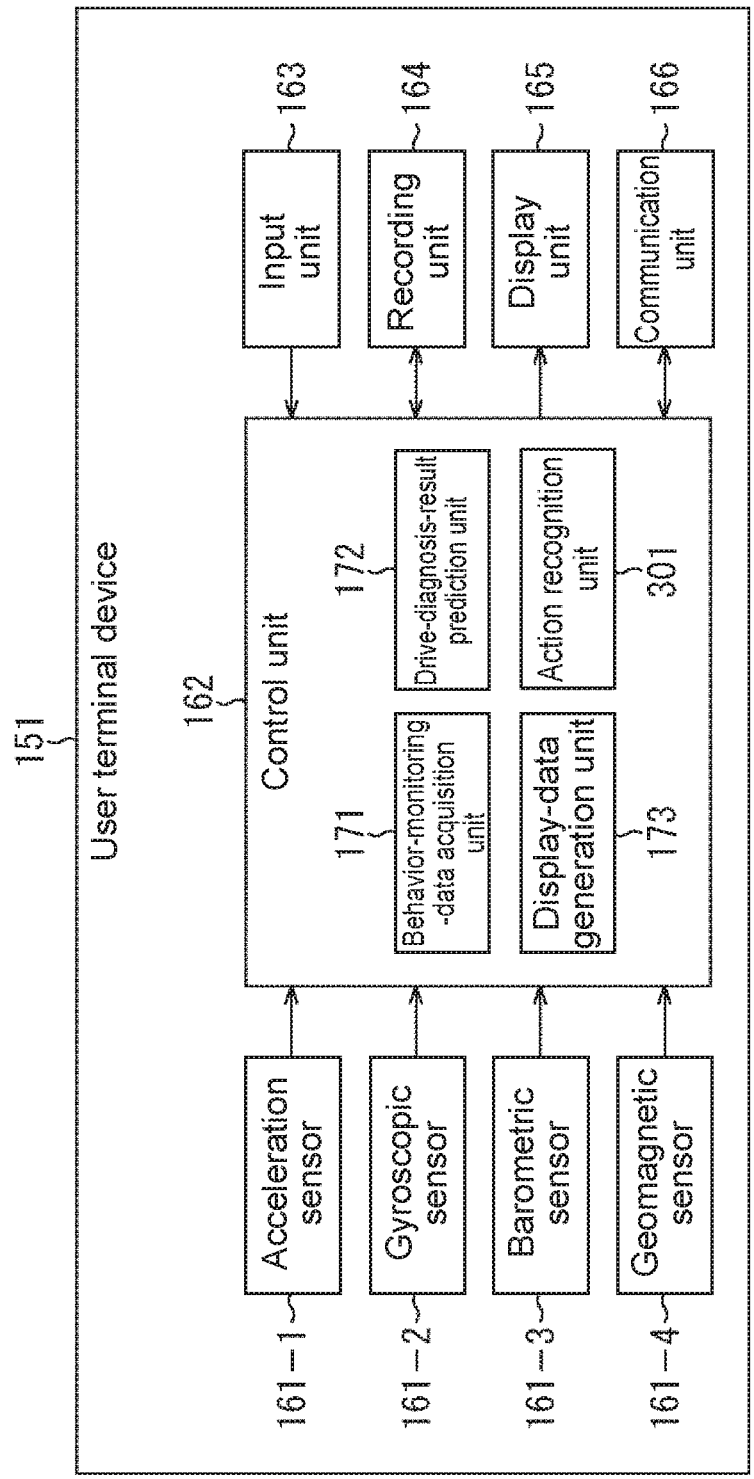
FIG. 18 A diagram showing yet another configuration example of the user terminal device.

For such a case, the user terminal device 151 is configured as shown in FIG. 18, for example. Note that, in FIG. 18, units corresponding to those in the case of FIG. 4 are denoted by the same reference symbols to omit description thereof as appropriate.

The user terminal device 151 shown in FIG. 18 includes the acceleration sensor 161-1 to the communication unit 166. Specifically, the control unit 162 includes the behavior-monitoring-data acquisition unit 171, the drive-diagnosis-result prediction unit 172, the display-data generation unit 173, and an action recognition unit 301.

The configuration of the user terminal device 151 shown in FIG. 18 is the same as the configuration of the user terminal device 151 shown in FIG. 4 except that the control unit 162 further includes the action recognition unit 301.

On the basis of the outputs from one or a plurality of acceleration sensor 161-1 to the geomagnetic sensor 161-4, that is, from at least any one of the sensors 161, the action recognition unit 301 performs action recognition of recognizing (specifying) how the user carrying the user terminal device 151 acts, that is, an action status of the user.

By the action recognition, any of a plurality of action statuses including "Pausing," "Walking," "Running," "Bicycling," and "Riding in Automobile" is obtained to be the action recognition result. In other words, to which of these plurality of action statuses the action status of the user corresponds is recognized.

Specifically, the "Stopping" as the action recognition result refers, for example, to a status in which the user pauses irrespective of whether or not the user is riding in the automobile or the like. The "Walking" refers to a status in which the user is walking, and the "Running" refers to a status in which the user is running.

Further, the "Bicycling" as the action recognition result refers to a status in which the user is bicycling, and the "Riding in Automobile" refers to a status in which the user is riding in the automobile.

Note that, whether the user is riding in the automobile can be recognized on the basis of, for example, variations in moving speed and time direction of the moving speed of the user terminal device 151, which are specified from the outputs from the sensors 161, that is, on the basis of those of the user.

Note that, by the action recognition, it is appropriate that any of the two or more of the action statuses, which include at least the "Riding in Automobile," be obtained to be the action recognition result.

The behavior-monitoring-data acquisition unit 171 detects, on the basis of the action recognition result from the action recognition unit 301, a timing (time point) when the user ends the driving of the automobile, and then ends the collection (acquisition) of the behavior-monitoring data items.

<Description of Still Another Behavior-Monitoring-Data Collection Procedure>

Next, a procedure to be executed by the user terminal device 151 when the user terminal device 151 is configured as shown in FIG. 18 is described.

Specifically, in the following, with reference to the flowchart of FIG. 19, still another behavior-monitoring-data collection procedure by the user terminal device 151 is described. This behavior-monitoring-data collection procedure is started, for example, when the dedicated application program installed in the user terminal device 151 is activated, that is, when the user starts the driving.

When the still other behavior-monitoring-data collection procedure is started, a process of Step S231 is executed to start the acquisition of the behavior-monitoring data items.

The process of Step S231 is similar to the process of Step S91 in FIG. 8, and hence description thereof is omitted.

In Step S232, the action recognition unit 301 performs the action recognition with respect to the user on the basis of the outputs from the acceleration sensor 161-1 to the geomagnetic sensor 161-4. By the action recognition, the action statuses of the user, such as the "Riding in Automobile," are recognized.

In Step S233, the behavior-monitoring-data acquisition unit 171 determines, on the basis of a recognition result of the action recognition in Step S232, whether or not the user is riding in the automobile.

For example, when the action status indicating the "Riding in Automobile" is obtained to be the result of the action recognition, it is determined that the user is riding in the automobile.

Further, more specifically, for example, even when the result of the action recognition by the action recognition unit 301 changes from the status of the "Riding in Automobile" to the action status other than the "Riding in Automobile," it is not immediately determined that the user is riding in the automobile.

Specifically, for example, after the result of the action recognition changes from the status of the "Riding in Automobile" to the action status other than the "Riding in Automobile," when the action recognition result indicating the action status other than the "Riding in Automobile" is obtained and remains unchanged for a predetermined time period, it is determined in Step S233 that the user is not riding in the automobile.

In addition, a timing when the result of the action recognition changes from the status of the "Riding in Automobile" to the action status other than the "Riding in Automobile" is recognized as the timing when the user ends the driving of the automobile. The outputs from the sensors 161 until the timing of the end of the driving are collected as the behavior-monitoring data items.

In other words, a timing when the action status other than the "Riding in Automobile" starts to be monitored as the result of the action recognition after the user starts the driving is recognized as the timing of the end of the driving. With this, accuracy in specifying the timing when the user ends the driving of the automobile can be increased.

When it is determined in Step S233 that the user is riding in the automobile, in Step S234, the behavior-monitoring-data acquisition unit 171 continues to acquire (collect) the behavior-monitoring data items. Then, the procedure returns to Step S232, and the above-described processes are repeated.

In contrast, when it is determined in Step S233 that the user is not riding in the automobile, that is, the user has ended the driving of the automobile, the procedure proceeds to Step S235.

In Step S235, the behavior-monitoring-data acquisition unit 171 ends the acquisition (collection) of the behavior-monitoring data items, and then the still other behavior-monitoring-data collection procedure is ended.

As described above, the user terminal device 151 performs the action recognition at the time of collecting the behavior-monitoring data items, and specifies the end of the automobile driving by the user from the result of the action recognition. With this, without a need for the user to perform the operation inputs at the time of the end of the driving, the timing when the acquisition of the behavior-monitoring data items is ended can be specified. As a result, convenience can be increased.

Note that, the still other behavior-monitoring-data collection procedure described with reference to FIG. 19 corresponds, for example, to Step S91 in FIG. 8, Step S121 in FIG. 12, Step S161 in FIG. 14, and Step S191 in FIG. 17.

Figure 12:
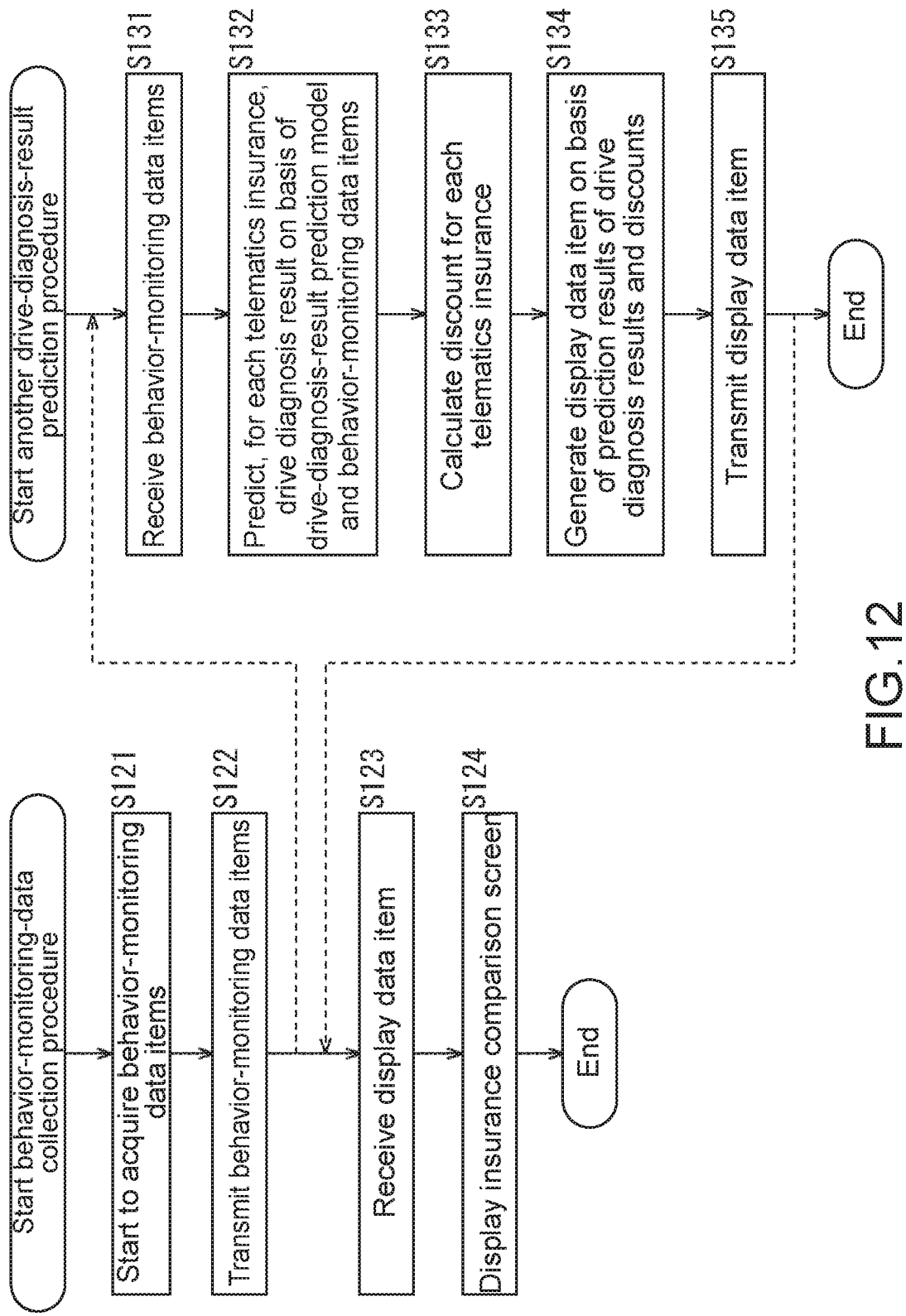
FIG. 12 Explanatory flowcharts showing a behavior-monitoring-data collection procedure and another drive-diagnosis-result prediction procedure.
Figure 17:
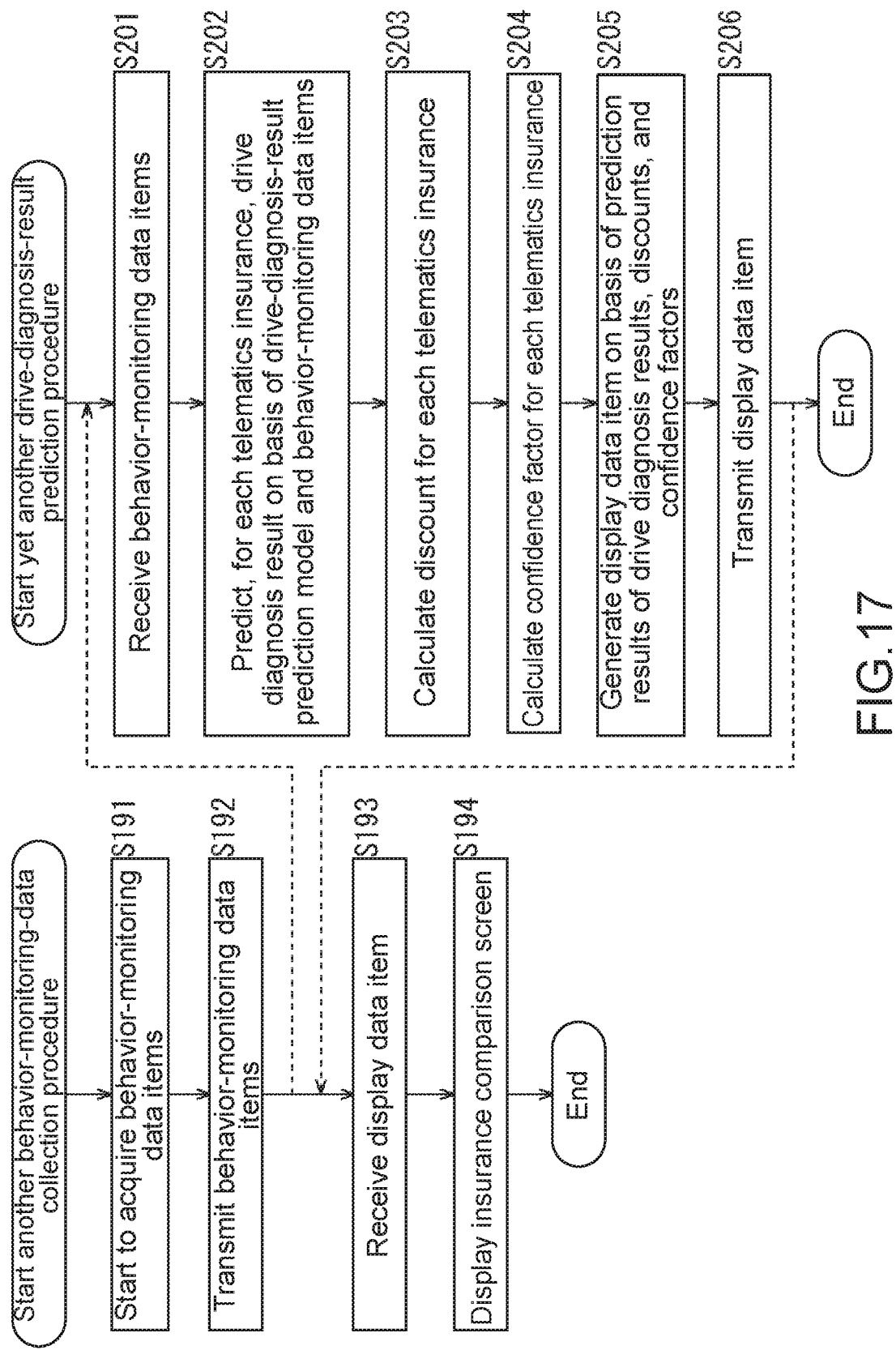
FIG. 17 Explanatory flowcharts showing another behavior-monitoring-data collection procedure and yet another drive-diagnosis-result prediction procedure.

Thus, for example, when the procedures described with reference to these FIG. 8, FIG. 12, FIG. 14, and FIG. 17 are executed, processes similar to the processes described with reference to FIG. 19 may be executed in Step S91 in FIG. 8, Step S121 in FIG. 12, Step S161 in FIG. 14, and Step S191 in FIG. 17.

Modification 1 of Third Embodiment

<Yet Another Configuration Example of User Terminal Device>

Further, position measurement systems such as a GPS (Global Positioning System) may be utilized such that a position of the user, that is, a position of the user terminal device 151 is specified, and that the timings when the user starts and ends the driving of the automobile are specified on the basis of results of the specification.

Many of the times when the user drives the automobile correspond to times when the user uses the automobile for trips between specific positions such as those between a garage of his/her house and his/her workplace or a supermarket.

In view of such circumstances, for example, pairs of the specific positions may be recorded (registered) in advance as a start position and an end position of driving on a route that the user frequently uses, that is, positions of both ends of a driving path, and these positions may be utilized for the collection of the behavior-monitoring data items.

In this case, for example, the "Riding in Automobile" being the result of the action recognition, and a time period in which the user moves from one of the positions to another one of the positions of both the end positions of the driving path may be specified as the time period in which the user drives the automobile.

Note that, the positions of both the ends of the driving path are referred to as "registered positions," and it is assumed that a driving-path information item indicating the registered positions in a pair is recorded in the user terminal device 151. It can also be said that this driving-path information item is an information item indicating a driving path defined by two registered positions.

Figure 20:
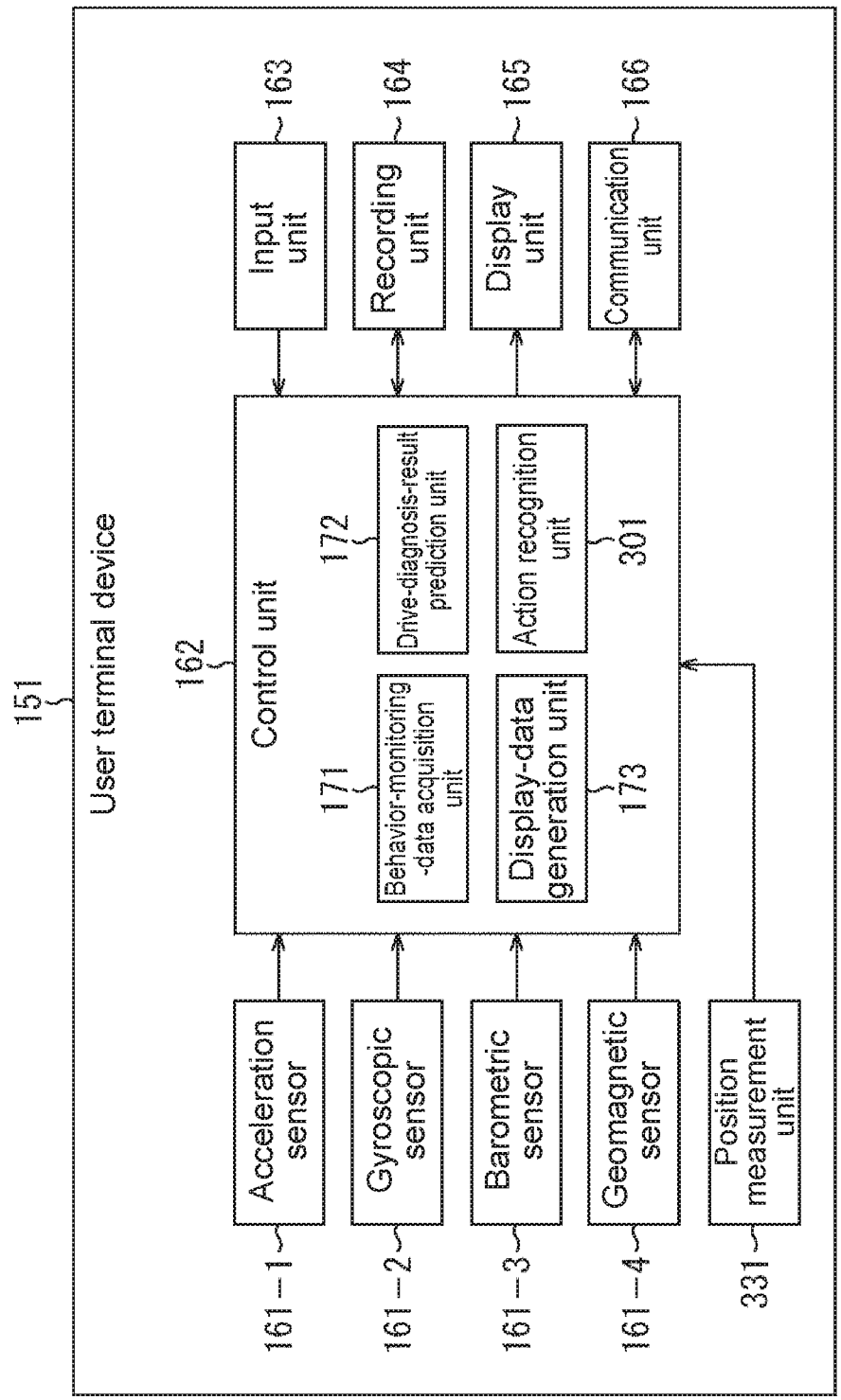

When the behavior-monitoring data items are collected by utilizing such a driving-path information item, the user terminal device 151 is configured as shown in FIG. 20, for example. Note that, in FIG. 20, units corresponding to those in the case of FIG. 18 are denoted by the same reference symbols to omit description thereof as appropriate.

The user terminal device 151 shown in FIG. 20 includes the acceleration sensor 161-1 to the communication unit 166, and a position measurement unit 331. Specifically, the control unit 162 includes the behavior-monitoring-data acquisition unit 171, the drive-diagnosis-result prediction unit 172, the display-data generation unit 173, and the action recognition unit 301.

The configuration of the user terminal device 151 shown in FIG. 20 is the same as the configuration of the user terminal device 151 shown in FIG. 18 except in further including the position measurement unit 331.

The position measurement unit 331 measures the position of the user, that is, the position of the user terminal device 151 with use of the position measurement systems such as the GPS, and supplies (outputs) a result of the measurement as a measured-position information item to the control unit 162. For example, when the position measurement unit 331 performs the position measurement with use of the GPS, GPS coordinates are output as the measured-position information item.

Further, the behavior-monitoring-data acquisition unit 171, which stores the one or the plurality of driving-path information items in advance, collects (acquires) the behavior-monitoring data items on the basis of the driving-path information items, the measured-position information item from the position measurement unit 331, and the action recognition result from the action recognition unit 301. In other words, the driving time period from the start of the driving to the end of the driving of the automobile by the user, in which the behavior-monitoring data items are collected, is specified.

Note that, the driving-path information items may be generated by the behavior-monitoring-data acquisition unit 171, for example, by the operation inputs to the input unit 163, or on the basis of a previous drive history of the user, or may be acquired from outside via the communication unit 166.

Specifically, the user, for example, may input the positions of both the ends of the driving path via, for example, a map information item by operating the input unit 163, and the behavior-monitoring-data acquisition unit 171 may generate the driving-path information item in response to the signal supplied from the input unit 163 in response to the operation by the user.

Alternatively, for example, when the user drives the automobile after explicitly inputting the timings of the start and the end of the driving of the automobile, a pair of a measured-position information item output from the position measurement unit 331 at the timing of the start of the driving, and a measured-position information item output from the position measurement unit 331 at the timing of the end of the driving may be recorded as the pair of the registered positions. In this way, the driving-path information item may be generated.

<Description of Yet Another Behavior-Monitoring-Data Collection Procedure>

Next, a procedure to be executed by the user terminal device 151 when the user terminal device 151 is configured as shown in FIG. 20 is described.

Figure 21:
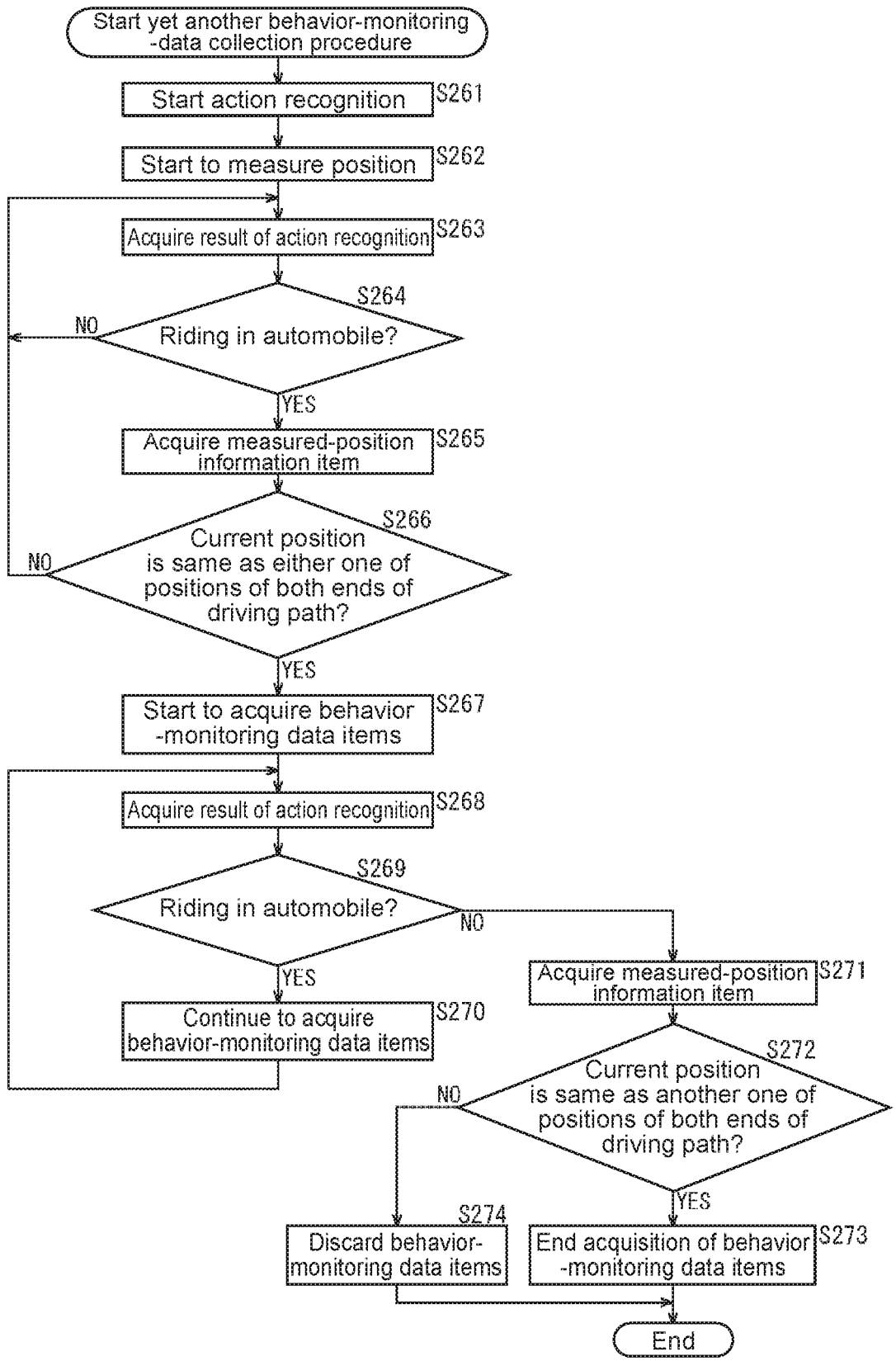
FIG. 21 An explanatory flowchart showing yet another behavior-monitoring-data collection procedure.

Specifically, in the following, with reference to the flowchart of FIG. 21, yet another behavior-monitoring-data collection procedure by the user terminal device 151 is described.

In Step S261, the action recognition unit 301 starts the action recognition with respect to the user on the basis of the outputs from the acceleration sensor 161-1 to the geomagnetic sensor 161-4. In other words, in Step S261, a process similar to that of Step S232 in FIG. 19 is executed.

In Step S262, the position measurement unit 331 starts to measure the position of the user, that is, the position of the user terminal device 151.

In Step S263, the behavior-monitoring-data acquisition unit 171 acquires the result of the action recognition from the action recognition unit 301.

In Step S264, the behavior-monitoring-data acquisition unit 171 determines, on the basis of the result of the action recognition, which is acquired by the process of Step S263, whether or not the user is riding in the automobile. For example, in Step S264, when the acquired result of the action recognition is the action status indicating the "Riding in Automobile," it is determined that the user is riding in the automobile.

When it is determined in Step S264 that the user is not riding in the automobile, the procedure returns to Step S263, and the above-described processes are repeated.

In contrast, when it is determined in Step S264 that the user is riding in the automobile, in Step S265, the behavior-monitoring-data acquisition unit 171 acquires the measured-position information item from the position measurement unit 331. With this, the behavior-monitoring-data acquisition unit 171 can specify a current position of the user terminal device 151.

In Step S266, the behavior-monitoring-data acquisition unit 171 determines whether or not the current position of the user terminal device 151 is the same as either one of the positions of both the ends of the driving path that is indicated by the driving-path information item stored in advance.

Specifically, the behavior-monitoring-data acquisition unit 171 compares the current position of the user terminal device 151, which is indicated by the measured-position information item acquired in Step S265, and the registered positions that are indicated by all the stored driving-path information items to each other. Then, when the current position of the user terminal device 151 is the same as one of the registered positions, the behavior-monitoring-data acquisition unit 171 determines that the current position is the same as either one of the positions of both the ends of the driving path.

Note that, more specifically, when a distance between the current position of the user terminal device 151 and the registered position is equal to or less than a predetermined threshold, it is determined that the current position is the same as the registered position.

When it is determined in Step S266 that the current position is the same as neither one of the positions of both the ends of the driving path, the procedure returns to Step S263, and the above-described processes are repeated.

In contrast, when it is determined in Step S266 that the current position is the same as either one of the positions of both the ends of the driving path, it is determined that the user has started to drive the automobile, and the procedure proceeds to Step S267.

At this time, the behavior-monitoring-data acquisition unit 171 specifies one of the driving paths as an attention driving path, the one including, as the registered position, the same position as the current position of the user terminal device 151. Note that, the attention driving path may be one, or may include a plurality of attention driving paths.

In Step S267, the behavior-monitoring-data acquisition unit 171 starts to acquire (collect) the behavior-monitoring data items. Note that, in Step S267, a process similar to that of Step S231 in FIG. 19 is executed.

In Step S268, the behavior-monitoring-data acquisition unit 171 acquires the result of the action recognition from the action recognition unit 301.

In Step S269, the behavior-monitoring-data acquisition unit 171 determines, on the basis of the result of the action recognition, which is acquired by the process of Step S268, whether or not the user is riding in the automobile.

For example, in Step S269, when the acquired result of the action recognition is the action status indicating the "Riding in Automobile," it is determined that the user is riding in the automobile.

Figure 19:
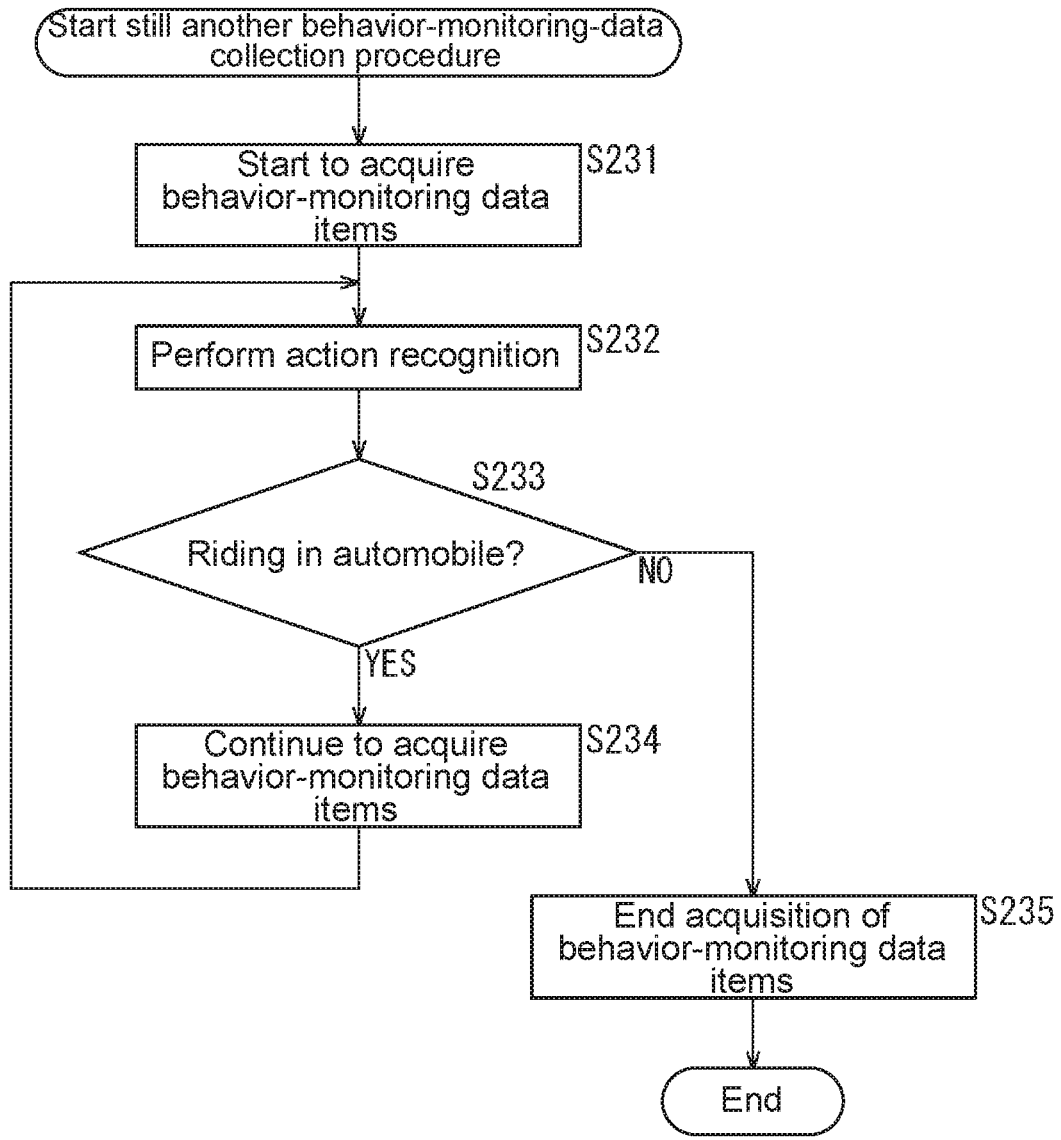
FIG. 19 An explanatory flowchart showing still another behavior-monitoring-data collection procedure FIG. 20 A diagram showing yet another configuration example of the user terminal device.

Specifically, as in Step S233 in FIG. 19, for example, after the result of the action recognition changes from the status of the "Riding in Automobile" to the action status other than the "Riding in Automobile," when the action recognition result indicating the action status other than the "Riding in Automobile" is obtained and remains unchanged for a predetermined time period, it may be determined that the user is not riding in the automobile.

When it is determined in Step S269 that the user is riding in the automobile, in Step S270, the behavior-monitoring-data acquisition unit 171 continues to acquire (collect) the behavior-monitoring data items. After the process of Step S270 is executed, the procedure returns to Step S268, and the above-described processes are repeated.

In contrast, when it is determined in Step S269 that the user is not riding in the automobile, in Step S271, the behavior-monitoring-data acquisition unit 171 acquires the measured-position information item from the position measurement unit 331.

In Step S272, the behavior-monitoring-data acquisition unit 171 determines whether or not the current position of the user terminal device 151 is the same as another one of the positions of both the ends of the attention driving path.

Specifically, the behavior-monitoring-data acquisition unit 171 compares the current position of the user terminal device 151, which is indicated by the measured-position information item acquired in Step S271, and the registered positions that are indicated by a driving-path information item of the attention driving path to each other. At this time, one of the registered positions on the attention driving path is the same as the position indicated by the measured-position information item acquired in Step S265. Thus, the other one of the position on the attention driving path and the current position of the user terminal device 151 are compared to each other.

Then, when the current position of the user terminal device 151 is the same as another one of the registered positions on the driving path being the attention driving path, the behavior-monitoring-data acquisition unit 171 determines that the current position is the same as the other one of the positions of both the ends of the driving path.

Thus, when it is determined that the current position is the same as the other one of the positions of both the ends of the driving path, the user has already driven the automobile from the one of the registered positions to the other one of the registered positions on the attention driving path, and ended the driving of the automobile.

In this way, on the basis of the results of the position measurement by the position measurement unit 331, and of the results of the action recognition by the action recognition unit 301, the behavior-monitoring-data acquisition unit 171 specifies the time period in which the user drives the automobile, that is, the timings of the start and the end of the driving.

When it is determined in Step S272 that the current position is the same as the other one of the positions of both the ends of the driving path, in other words, when the automobile is driven along the driving path, and then when the driving of the automobile is ended, the procedure proceeds to Step S273.

In Step S273, the behavior-monitoring-data acquisition unit 171 ends the acquisition (collection) of the behavior-monitoring data items, and then the yet other behavior-monitoring-data collection procedure is ended.

In contrast, when it is determined in Step S272 that the current position is not the same as the other one of the positions of both the ends of the driving path, the procedure proceeds to Step S274.

In this case, the user may have driven the automobile between positions other than those on the driving path, or the user may not have actually driven the automobile. Thus, the behavior-monitoring-data acquisition unit 171 determines that the user has not driven the automobile. In other words, a time period after the start of the process of Step S267 is not regarded as a collection-target time period for the behavior-monitoring data items.

In Step S274, the behavior-monitoring-data acquisition unit 171 discards the behavior-monitoring data items that have started to be collected by the process of Step S267, that is, the previously-obtained behavior-monitoring data items. Then, the yet other behavior-monitoring-data collection procedure is ended.

As described above, on the basis of the results of the action recognition, and of the positions of the user terminal device 151, the user terminal device 151 specifies the time period in which the user drives the automobile, and the user terminal device 151 collects the behavior-monitoring data items during this time period. With this, without the need for the user to perform the operation inputs, the time period in which the behavior-monitoring data items should be collected can be specified. As a result, convenience can be increased.

Note that, as the still other behavior-monitoring-data collection procedure described with reference to FIG. 19 corresponds, the yet other behavior-monitoring-data collection procedure described with reference to FIG. 21 corresponds, for example, to Step S91 in FIG. 8, Step S121 in FIG. 12, Step S161 in FIG. 14, and Step S191 in FIG. 17.

Thus, for example, when the procedures described with reference to these FIG. 8, FIG. 12, FIG. 14, and FIG. 17 are executed, processes similar to the processes described with reference to FIG. 21 may be executed in Step S91 in FIG. 8, Step S121 in FIG. 12, Step S161 in FIG. 14, and Step S191 in FIG. 17.

Fourth Embodiment

<Yet Another Configuration Example of User Terminal Device>

Incidentally, the user terminal device 151 collects the outputs from the sensors 161 as the behavior-monitoring data items. The collected behavior-monitoring data items are data items during the period in which the user drives the automobile, and hence are not data items that directly indicate the driving behaviors of the user. However, the driving behaviors at the time when the user drives the automobile can be specified from these behavior-monitoring data items.

Specifically, ones of the driving behaviors by the user, such as sudden braking and sudden acceleration, can be specified, for example, from a result of the measurement of the acceleration being the output from the acceleration sensor 161-1. Further, another one of the driving behaviors, such as sudden steering, also can be specified, for example, from time-series variations in angular velocity being the output from the gyroscopic sensor 161-2 and in orientation being the output from the geomagnetic sensor 161-4.

In view of such circumstances, on the basis of the behavior-monitoring data items collected during the time period of the driving by the user, some of the time periods (intervals) in which the results of the predictions of the drive diagnosis results with use of the drive-diagnosis-result prediction models, that is, time periods in which actual drive-diagnosis results are supposed to be aggravated, and the driving behaviors that aggravate the results of the predictions may be specified and utilized for improvement of the drive diagnosis results about the telematics insurances. Specifically, it is conceived that, for example, notifications of the driving behaviors to be factors to aggravate the drive diagnosis results are provided (presented) to the user such that the user is prompted to the improvement.

In such a case, for example, a notification for improvement of the drive diagnosis result about a telematics insurance for which the user has actually applied may be provided, or a notification for improvement of the drive diagnosis result about a telematics insurance for which the user has not yet applied may be provided.

This prompts the user to pay attention to his/her driving behaviors, whereby the drive diagnosis result about the telematics insurance that the user has been using or thinks of using can be improved.

As an example of methods of specifying the periods in which the drive diagnosis results are aggravated, and specifying the driving behaviors that aggravate the drive diagnosis results, the following method is conceived.

When all the previous time periods in which the behavior-monitoring data items are collected, that is, accumulation of all the time periods is referred to as an "entire diagnosis-target time period," first, the entire diagnosis-target time period is divided into a plurality of intervals (hereinafter, also referred to as "divided intervals"). Note that, length of the divided intervals (time periods) may be the same as or may be different from each other.

Then, one of the plurality of divided intervals is selected as a processing-target divided interval, and rest of the intervals in the entire diagnosis-target time period except the processing-target divided interval are set as excluded diagnosis-target intervals. Next, the drive diagnosis results are predicted on the basis of ones of the behavior-monitoring data items, which are collected during the excluded diagnosis-target intervals.

Further, the prediction result of the drive diagnosis result in the entire diagnosis-target time period, and each of the prediction results of the drive diagnosis results in the excluded diagnosis-target intervals are compared to each other. When each of the prediction results in the excluded diagnosis-target intervals is improved, the processing-target divided interval is determined as the interval in which the drive diagnosis result is aggravated.

When the processing-target divided interval is determined as the interval in which the drive diagnosis result is aggravated, a characteristic information item of the processing-target divided interval is extracted on the basis of ones of the behavior-monitoring data items, which are collected during the processing-target divided interval.

The characteristic information item herein refers to an information item indicating the driving behaviors to be the factors to aggravate the drive diagnosis result. Specifically, for example, on the basis of the behavior-monitoring data items, the numbers of the driving behaviors such as the sudden braking, the sudden acceleration, and the sudden steering, which are exhibited in the processing-target divided interval, are counted. Then, one with the largest count of the driving behaviors is extracted as the driving behavior to be the factor to aggravate the drive diagnosis result (hereinafter, also referred to as "aggravating-factor behavior").

Such processes are executed on all the divided intervals. With this, a display data item of a screen that notifies of the aggravating-factor behavior, that is, an improvement proposal screen being a screen that proposes improvement measures for the drive diagnoses is generated. On the basis of this display data item, the improvement proposal screen is presented (displayed) to the user.

By presenting the improvement proposal screen in this way so as to make a proposal to reduce the aggravating-factor behavior to the user, feedback of the improvement of the drive diagnosis result about the actual telematics insurance can be provided.

Figure 22:
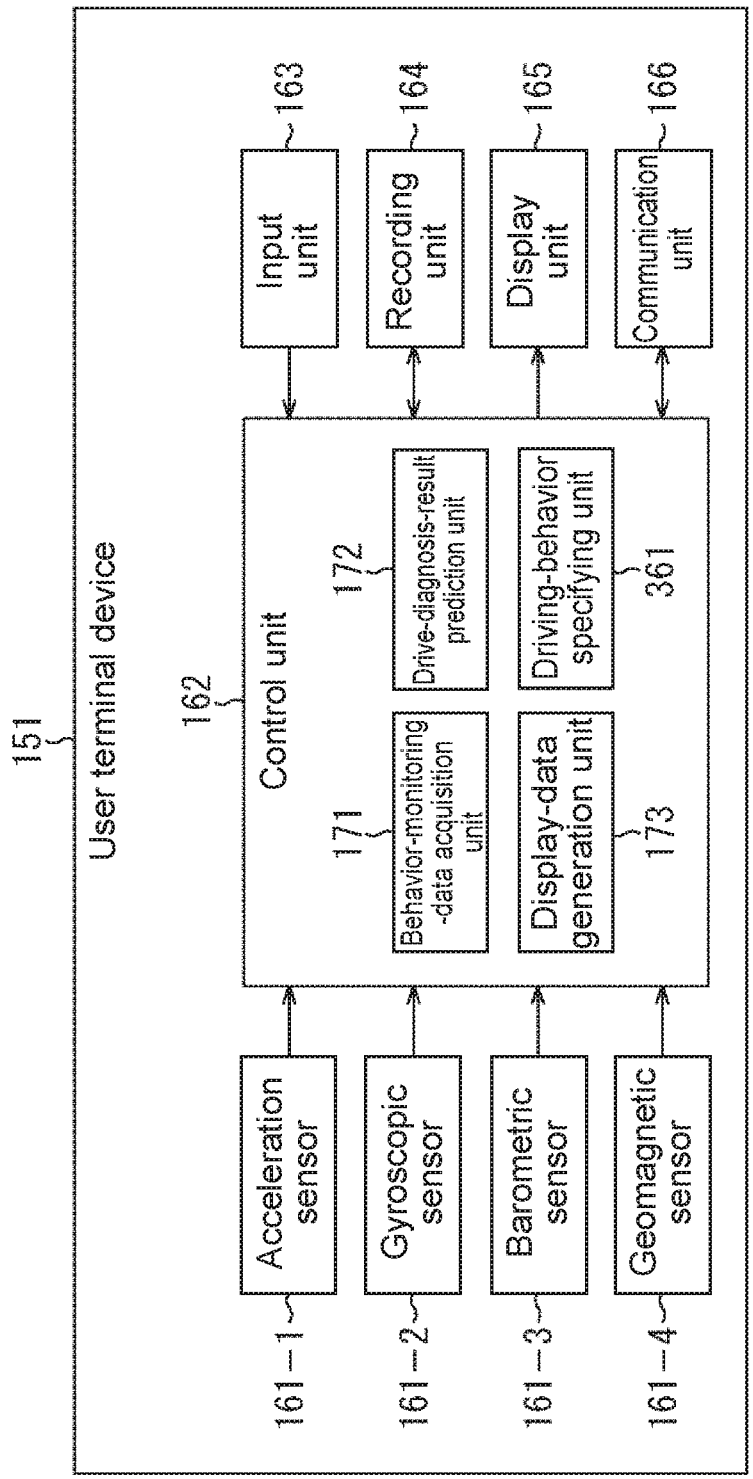
FIG. 22 A diagram showing yet another configuration example of the user terminal device.

When some of the intervals, in each of which the drive diagnosis result is aggravated, and the driving behavior that aggravates the drive diagnosis result are specified, and the improvement proposal screen is displayed in this way, the user terminal device 151 is configured as shown in FIG. 22, for example. Note that, in FIG. 22, units corresponding to those in the case of FIG. 4 are denoted by the same reference symbols to omit description thereof as appropriate.

The user terminal device 151 shown in FIG. 22 includes the acceleration sensor 161-1 to the communication unit 166. Specifically, the control unit 162 includes the behavior-monitoring-data acquisition unit 171, the drive-diagnosis-result prediction unit 172, the display-data generation unit 173, and a driving-behavior specifying unit 361.

The configuration of the user terminal device 151 shown in FIG. 22 is the same as the configuration of the user terminal device 151 shown in FIG. 4 except that the control unit 162 further includes the driving-behavior specifying unit 361.

The drive-diagnosis-result prediction unit 172 reads out the behavior-monitoring data items recorded in the recording unit 164, and sets, as the entire diagnosis-target time period, the time periods in which these behavior-monitoring data items are collected (acquired). Further, the drive-diagnosis-result prediction unit 172 predicts the drive diagnosis result in each of the excluded diagnosis-target intervals in the entire diagnosis-target time period, thereby specifying the divided interval in which the drive diagnosis result is aggravated.

On the basis of ones of the behavior-monitoring data items, which are collected during the divided interval in which the drive diagnosis result is aggravated, the driving-behavior specifying unit 361 extracts the characteristic information item of this divided interval. The display-data generation unit 173 generates the display data item of the improvement proposal screen on the basis of the characteristic information item extracted by the driving-behavior specifying unit 361.

<Description of Presentation Procedure>

Next, operations of the user terminal device 151 shown in FIG. 22 are described. Specifically, in the following, with reference to the flowchart of FIG. 23, a presentation procedure by the user terminal device 151 is described.

In Step S301, the drive-diagnosis-result prediction unit 172 predicts the drive diagnosis result on the basis of the behavior-monitoring data items in the entire diagnosis-target time period, and of the stored drive-diagnosis-result prediction model.

Specifically, the drive-diagnosis-result prediction unit 172 reads out, from the recording unit 164, all the behavior-monitoring data items that have been previously collected from the user and recorded in the recording unit 164, and sets, as the entire diagnosis-target time period, the time periods in which the read-out behavior-monitoring data items are collected. Then, the drive-diagnosis-result prediction unit 172 predicts the drive diagnosis result on the basis of the drive-diagnosis-result prediction model stored in advance, and of the behavior-monitoring data items in the entire diagnosis-target time period.

In Step S302, the drive-diagnosis-result prediction unit 172 divides the entire diagnosis-target time period arbitrarily into the plurality of divided intervals.

In Step S303, the drive-diagnosis-result prediction unit 172 selects one of the plurality of divided intervals as the processing-target divided interval.

In Step S304, the drive-diagnosis-result prediction unit 172 sets the rest of the intervals in the entire diagnosis-target time period except the processing-target divided interval as the excluded diagnosis-target intervals, and predicts the drive diagnosis results on the basis of the behavior-monitoring data items in the excluded diagnosis-target intervals, and of the drive-diagnosis-result prediction model.

In Step S305, the drive-diagnosis-result prediction unit 172 determines whether or not each of the prediction results of the drive diagnosis results in the excluded diagnosis-target intervals has been improved.

For example, when the score indicating the degree of safe driving is obtained to be the prediction result of the drive diagnosis result, the drive-diagnosis-result prediction unit 172 calculates a difference by subtracting the prediction result of the drive diagnosis result in the entire diagnosis-target time period from each of the prediction results of the drive diagnosis results in the excluded diagnosis-target intervals.

Then, when the calculated difference is equal to or more than a preset threshold, the drive-diagnosis-result prediction unit 172 determines that corresponding one of the prediction results of the drive diagnosis results in the excluded diagnosis-target intervals has been improved. In other words, when each of the prediction results of the drive diagnosis results in the excluded diagnosis-target intervals increases to be larger by the threshold or more than the prediction result of the drive diagnosis result in the entire diagnosis-target time period, it is determined that corresponding one of the prediction results has been improved.

In still other words, the drive-diagnosis-result prediction unit 172 specifies a divided interval to be the factor to aggravate the drive diagnosis result by comparing each of the prediction results of the drive diagnosis results in the excluded diagnosis-target intervals, and the prediction result of the drive diagnosis result in the entire diagnosis-target time period to each other.

When it is determined in Step S305 that the prediction results have been improved, in Step S306, the driving-behavior specifying unit 361 extracts the characteristic information item of the processing-target divided interval. Then, the procedure proceeds to Step S307.

Specifically, for example, the driving-behavior specifying unit 361 specifies, on the basis of the behavior-monitoring data items in the processing-target divided interval, the driving behavior that the user exhibits at each time point in the processing-target divided interval, such as the sudden braking, the sudden acceleration, or the sudden steering.

Further, the driving-behavior specifying unit 361 counts how many times the driving behaviors monitored in this divided interval, that is, specified in this divided interval are exhibited (monitored) in this divided interval, and generates an information item indicating a driving behavior with the largest count as the characteristic information item.

Note that, the fact that the prediction result of the drive diagnosis result in each of the excluded diagnosis-target intervals is improved means that the processing-target divided interval is the interval to be the factor to aggravate the prediction result of the drive diagnosis result. Thus, in such a processing-target divided interval, a most frequently observed one, that is, a most frequently exhibited one of the driving behaviors is the aggravating-factor behavior that aggravates the prediction result of the drive diagnosis result.

The driving-behavior specifying unit 361 specifies the aggravating-factor behavior by calculating, on the basis of the behavior-monitoring data items, the number of each of the driving behaviors exhibited in the processing-target divided interval, and generates the characteristic information item indicating a result of the specification.

In contrast, when it is determined in Step S305 that the prediction results have not been improved, the procedure skips the process of Step S306, and proceeds to Step S307.

When it is determined in Step S305 that the prediction results have not been improved, or when the characteristic information item is extracted in Step S306, in Step S307, the drive-diagnosis-result prediction unit 172 determines whether or not the processes have been executed on all the divided intervals.

Specifically, when all the divided intervals have been set as the processing-target divided intervals, and then the processes of Step S304 to Step S306 have been executed on each of the processing-target divided intervals, it is determined that the processes have been executed on all the divided intervals.

When it is determined in Step S307 that the processes have not been executed on all the divided intervals, the procedure returns to Step S303, and the above-described processes are repeated.

In contrast, when it is determined in Step S307 that the processes have been executed on all the divided intervals, in Step S308, the display-data generation unit 173 generates the display data item of the improvement proposal screen on the basis of the characteristic information item obtained by the process of Step S306.

Specifically, the display-data generation unit 173 generates a display data item for displaying an improvement proposal screen that presents the aggravating-factor driving behavior indicated by the characteristic information item, and that provides a notification that the drive diagnosis result is improved by reducing this aggravating-factor driving behavior.

Note that, for example, when the characteristic information item to be obtained includes a plurality of characteristic information items, of the aggravating-factor driving behaviors indicated by these characteristic information items, an aggravating-factor driving behavior, for example, with the largest count, or an aggravating-factor driving behavior that is most frequency extracted as the characteristic information item may be presented on the improvement proposal screen. Alternatively, all the aggravating-factor behaviors may be presented on the improvement proposal screen.

Further, when the process of Step S306 has never been executed, and there is no particular need for improvement, the display data item is generated to display a notification that there is no particular need for improvement on the improvement proposal screen.

In Step S309, the display-data generation unit 173 supplies the display data item obtained in Step S308 to the display unit 165, and causes the display unit 165 to display the improvement proposal screen. Then, the presentation procedure is ended.

As described above, the user terminal device 151 specifies, on the basis of the behavior-monitoring data items, the interval in which the drive diagnosis result is aggravated, and the aggravating-factor behavior exhibited in that interval, and presents the improvement proposal screen in accordance with the results of the specification. This prompts the user to improve the driving behaviors of his/her own, whereby the user can obtain a better drive-diagnosis result.

Note that, in the example described in this embodiment, the characteristic information item is extracted from the divided interval corresponding to one of the excluded diagnosis-target intervals, in which the difference from the prediction result of the drive diagnosis result in the entire diagnosis-target time period is equal to or more than the threshold.

However, alternatively, for example, a predetermined number of the excluded diagnosis-target intervals may be selected in a descending order of the difference from ones of the excluded diagnosis-target intervals, in each of which the difference from the prediction result of the drive diagnosis result in the entire diagnosis-target time period is equal to or more than the threshold, and the display data item may be generated from the characteristic information items of ones of the divided intervals, which correspond to the selected ones of the excluded diagnosis-target intervals.

Further, in the example of the presentation procedure described with reference to FIG. 23, the divided interval to be the factor to aggravate the drive diagnosis result is specified. In contrast, a divided interval to be a factor to improve the drive diagnosis result may be specified.

Figure 23:
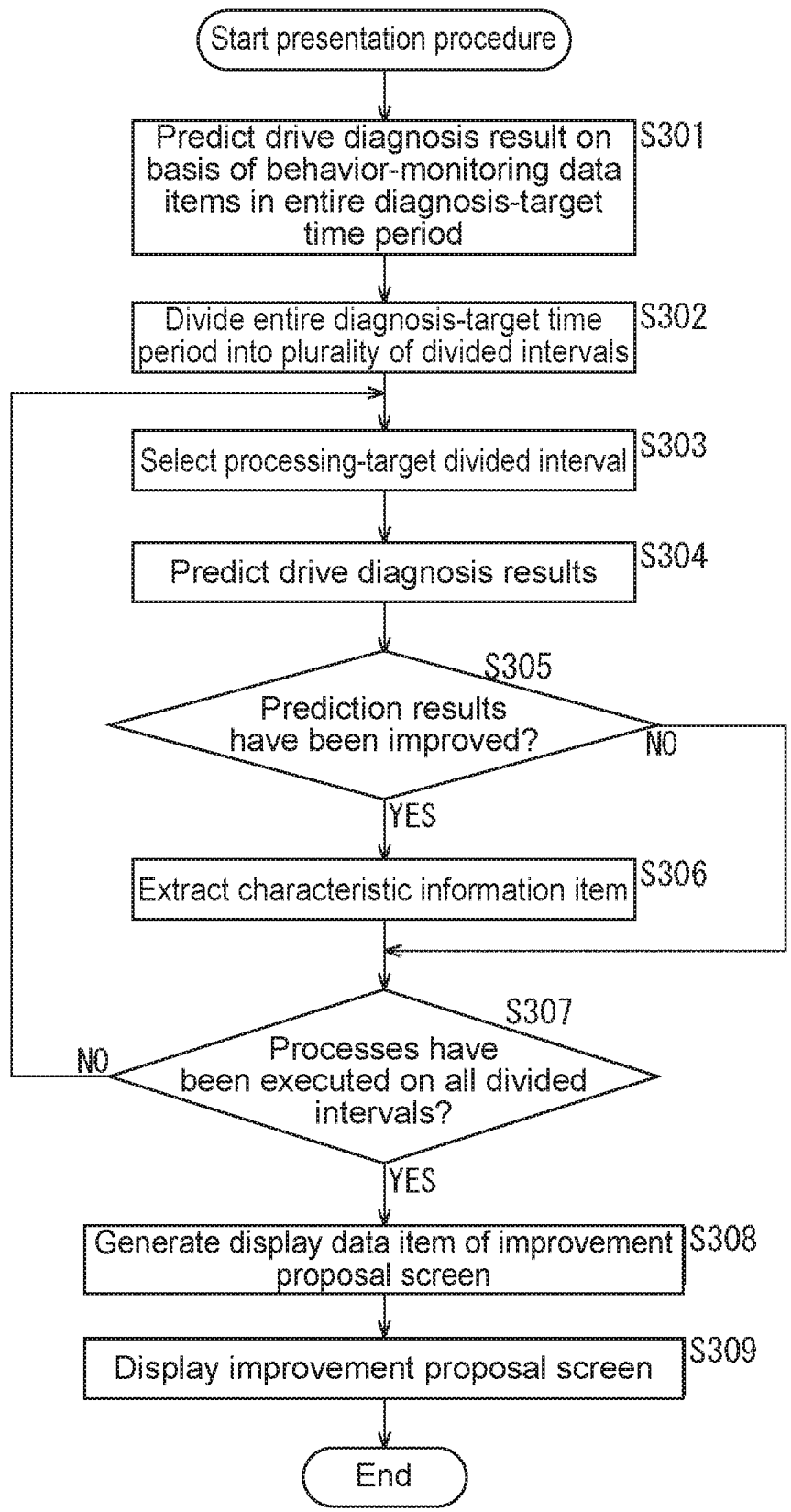
FIG. 23 An explanatory flowchart showing a presentation procedure.

In such a case, for example, in Step S305 in FIG. 23, the drive-diagnosis-result prediction unit 172 determines whether or not each of the prediction results of the drive diagnosis results in the excluded diagnosis-target intervals has been aggravated.

For example, when the score indicating the degree of safe driving is obtained to be the prediction result of the drive diagnosis result, the drive-diagnosis-result prediction unit 172 calculates a difference by subtracting each of the prediction results of the drive diagnosis results in the excluded diagnosis-target intervals from the prediction result of the drive diagnosis result in the entire diagnosis-target time period.

Then, when the calculated difference is equal to or more than the preset threshold, the drive-diagnosis-result prediction unit 172 determines that corresponding one of the prediction results of the drive diagnosis results in the excluded diagnosis-target intervals has been aggravated. In other words, when each of the prediction results of the drive diagnosis results in the excluded diagnosis-target intervals decreases to be lower by the threshold or more than the prediction result of the drive diagnosis result in the entire diagnosis-target time period, it is determined that corresponding one of the prediction results has been aggravated.

In still other words, the drive-diagnosis-result prediction unit 172 specifies the divided interval to be the factor to improve the drive diagnosis result by comparing each of the prediction results of the drive diagnosis results in the excluded diagnosis-target intervals, and the prediction result of the drive diagnosis result in the entire diagnosis-target time period to each other.

With this, in Step S306, a characteristic information item indicating a driving behavior to be the improvement factor is extracted from the divided interval to be the improvement factor.

Thus, the display data item to be generated in Step S308 is a display data item for displaying the improvement proposal screen on which the driving behavior to be the improvement factor, which is indicated by the characteristic information item, is indicated, and on which a notification that the drive diagnosis result is improved by increasing this driving behavior is displayed.

Further, a part of the presentation procedure described with reference to FIG. 23 may be executed in the server 101. In such a case, for example, the behavior-monitoring data items in the entire diagnosis-target time period are transmitted from the user terminal device 151 to the server 101.

The communication unit 111 of the server 101 receives the behavior-monitoring data items from the user terminal device 151, and supplies these data items to the control unit 112. Then, the control unit 112 generates the display data item by executing the processes of Step S301 to Step S308 in FIG. 23 on the basis of the behavior-monitoring data items supplied via the communication unit 111, and then supplies this display data item to the communication unit 111.

Further, the communication unit 111 transmits, to the user terminal device 151, the display data item supplied from the control unit 112. Then, the user terminal device 151 receives the displayed data item transmitted from the server 101, and displays the improvement proposal screen.

Note that, instead of the outputs from the sensors 161, which are acquired as the behavior-monitoring data items indicating the driving behaviors during the driving of the automobile in the example described hereinabove, other information items such as site information items during the driving, weather information items during the driving, time information items during the driving, and biometric information items of the user may be acquired as the behavior-monitoring data items, and used in the predictions of the drive diagnosis results.

Specifically, the site information items, which are information items indicating, for example, on what kind of road or through what kind of site the automobile is traveling, such as an intersection, an express way, or a gravel road, may be acquired, for example, from the position measurement systems such as the GPS, or a map-information providing system.

The weather information items, which are information items indicating, for example, current weather and a current temperature such as rain, fine weather, and sub-zero temperatures, can be acquired, for example, from a weather-information providing website. The time information items, which are information items indicating, for example, a current time and a current time zone such as those after sunset or at sunset, can be acquired, for example, from a time-information providing website.

Further, the biometric information items of the user, which are information items about the user of his/her own, such as those of a heart rate, a blood pressure, hours of sleep, drowsiness, and the number of paces in walking, that is, information items about a living body, can be acquired, for example, from a wearable device that the user wears via wireless communication or the like.

In addition, although the present technology is applied to the telematics insurances in the example described hereinabove, the present technology is applicable also, for example, to health insurances, medical insurances, and life insurances.

Specifically, when the present technology is applied to a life insurance that offers larger discounts to users who live healthier lives, information items such as a pulse and the hours of sleep of the user, and information items about health of the user, such as those of time periods in which the user uses a sports center, are acquired as the behavior-monitoring data items.

Then, on the basis of the acquired behavior-monitoring data items, and of a diagnosis-result prediction model corresponding to the drive-diagnosis-result prediction model calculated by learning in advance, diagnosis results about the insurance of the user are predicted. On the basis of results of the predictions, a discount of a premium is calculated. In this case, the diagnosis results about the insurance of the user are used as results of diagnoses of, for example, a health degree of the user and a preference degree of the premium.

<Configuration Example of Computer>

Incidentally, the above-described series of processes may be executed by hardware or by software. At a time of executing the series of processes by the software, programs of the software are installed in the computer. As examples of the computer, there may be mentioned a computer incorporated in dedicated hardware, and a general-purpose computer capable of exerting various functions in accordance with various programs installed therein.

Figure 24:
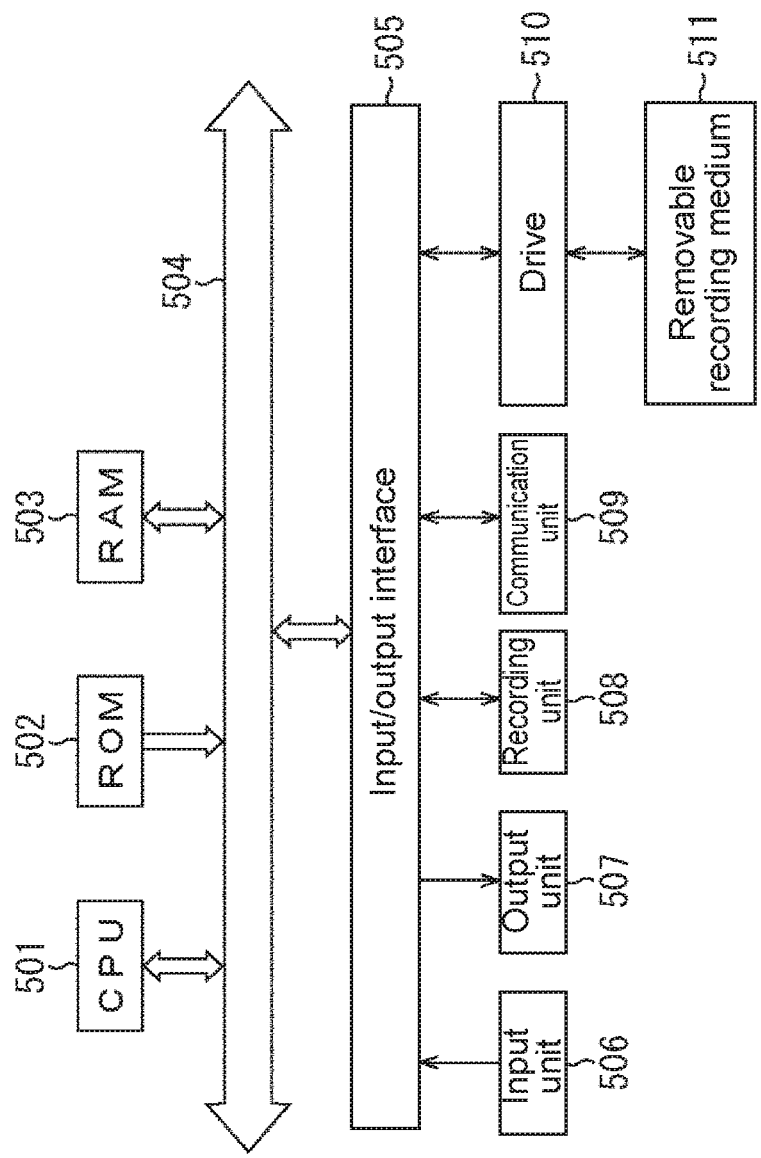
FIG. 24 A diagram showing a configuration example of a computer.

FIG. 24 is a block diagram showing a configuration example of the hardware of a computer that executes the above-described series of processes in accordance with the programs.

In the computer, a CPU (Central Processing Unit) 501, a ROM (Read Only Memory) 502, and a RAM (Random Access Memory) 503 are connected to each other via a bus 504.

An input/output interface 505 is also connected to the bus 504. An input unit 506, an output unit 507, a recording unit 508, a communication unit 509, and a drive 510 are connected to the input/output interface 505.

The input unit 506 includes a keyboard, a mouse, a microphone, and an imaging element. The output unit 507 includes a display and a speaker. The recording unit 508 includes a hard disk and a nonvolatile memory. The communication unit 509 includes a network interface. The drive 510 drives removable recording media 511 such as a magnetic disk, an optical disk, a magneto-optical disk, and a semiconductor memory.

In the computer configured as described above, for example, the CPU 501 loads a program recorded in the recording unit 508 to the RAM 503 via the input/output interface 505 and the bus 504, and executes the program. In this way, the above-described series of processes is executed.

The program to be executed by the computer (CPU 501) may be provided, for example, by being recorded in the removable recording medium 511 in a form of a packaged medium or the like. Alternatively, the program may be provided via wired or wireless transmission media such as a local area network, the Internet, and digital satellite broadcasting.

In the computer, the program may be installed into the recording unit 508 via the input/output interface 505 from the removable recording medium 511 loaded to the drive 510. Alternatively, the program may be installed into the recording unit 508 by being received by the communication unit 509 via the wired or the wireless transmission media. Still alternatively, the program may be pre-installed in the ROM 502 or the recording unit 508.

Note that, the program to be executed by the computer may be programs for executing the processes in time series in the order described herein, or may be programs for executing the processes parallel to each other or at necessary timings such as a timing of being called.

In addition, the embodiments of the present technology are not limited to the above-described embodiments, and various modifications may be made thereto without departing from the essence of the present technology.

For example, the present technology may employ a configuration of cloud computing in which one function is shared by a plurality of devices via a network and processed in cooperation with each other.

Further, Steps described above with reference to the flowcharts may be executed by a single device, or may be executed by a plurality of devices in a shared manner.

Still further, when a plurality of processes are contained in a single Step, the plurality of processes contained in the single Step may be executed by a single device, or may be executed by a plurality of devices in a shared manner.

Yet further, the advantages described herein are merely examples, and hence are not limited thereto. Thus, other advantages may be obtained.

Yet further, the present technology may also employ the following configurations.

(1)

An information processing device, including:

an acquisition unit that acquires an output from one sensor or outputs from a plurality of sensors different from each other as behavior-monitoring data items of a user; and a diagnosis-result prediction unit that predicts a diagnosis result about one insurance or diagnosis results about a plurality of insurances for the user on the basis of a prediction model calculated in advance by learning for the one insurance or each of the plurality of insurances, and on the basis of the behavior-monitoring data items.

(2)

The information processing device according to Item (1), further including a display-data generation unit that generates a display data item for presenting a result of the prediction of the diagnosis result about the one insurance, or results of the predictions of the diagnosis results about the plurality of insurances.

(3)

The information processing device according to Item (2), in which the display-data generation unit further calculates a discount or a premium of the one insurance on the basis of the result of the prediction, or discounts or premiums of the plurality of insurances on the basis of the results of the predictions, and the display data item that the display-data generation unit generates includes a display data item for presenting, together with the result of the prediction, the discount or the premium of the one insurance, or presenting, together with the results of the predictions, the discounts or the premiums of the plurality of insurances.

(4)

The information processing device according to any one of Items (1) to (3), in which the acquisition unit acquires, during driving by the user, the output from the one sensor or the outputs from the plurality of sensors different from each other as the behavior-monitoring data items, and the diagnosis-result prediction unit predicts a drive diagnosis result about the one insurance or drive diagnosis results about the plurality of insurances for the user on the basis of the prediction model, and on the basis of the behavior-monitoring data items.

(5)

The information processing device according to Item (4), in which the one insurance or each of the plurality of insurances is a telematics insurance.

(6)

The information processing device according to Item (2) or (3), further including a calculation unit that calculates, on the basis of the behavior-monitoring data items, a confidence factor or a prediction error of the result of the prediction of the diagnosis result about the one insurance, or confidence factors or prediction errors of the results of the predictions of the diagnosis results about the plurality of insurances, in which the display-data generation unit generates the display data item in accordance with the confidence factor or the prediction error of the result of the prediction, or in accordance with the confidence factors or the prediction errors of the results of the predictions.

(7)

The information processing device according to Item (6), in which the display data item that the display-data generation unit generates includes a display data item for presenting, together with the result of the prediction, the confidence factor or the prediction error of the result of the prediction, or presenting, together with the results of the predictions, the confidence factors or the prediction errors of the results of the predictions.

(8)

The information processing device according to Item (6) or (7), in which the display data item that the display-data generation unit generates includes a display data item for presenting the result of the prediction of the diagnosis result about the one insurance only when the confidence factor is equal to or more than a predetermined value or only when the prediction error is equal to or less than a predetermined value, or presenting the results of the predictions of the diagnosis results about the plurality of insurances only when the confidence factors are each equal to or more than the predetermined value or only when the prediction errors are each equal to or less than the predetermined value.

(9)

The information processing device according to Item (4) or (5), further including an action recognition unit that performs action recognition with respect to the user on the basis of the output from the one sensor or the outputs from the plurality of sensors different from each other, in which the acquisition unit acquires the behavior-monitoring data items on the basis of a result of the action recognition.

(10)

The information processing device according to Item (9), in which the action recognition unit recognizes, by the action recognition, to which one of a plurality of action statuses including at least riding by the user an action status of the user corresponds.

(11)

The information processing device according to Item (9) or (10), in which the acquisition unit specifies an end of the driving by the user on the basis of the result of the action recognition, and acquires the behavior-monitoring data items in accordance with a result of the specification.

(12)

The information processing device according to Item (9) or (10), in which the acquisition unit
specifies a start and an end of the driving by the user on the basis of position information items indicating positions of the user, and on the basis of the result of the action recognition, and
acquires the behavior-monitoring data items in accordance with a result of the specification.

(13)
The information processing device according to Item (4) or (5), in which
the behavior-monitoring data items include
behavior-monitoring data items in a predetermined time period, and
behavior-monitoring data items in each interval other than a certain interval in the predetermined time period,
a result of the prediction of the diagnosis result about the one insurance includes
a prediction result that is obtained from the behavior-monitoring data items in the predetermined time period, and
a prediction result that is obtained from the behavior-monitoring data items in each of the other intervals,
results of the predictions of the diagnosis results about the plurality of insurances include
prediction results that are obtained from the behavior-monitoring data items in the predetermined time period, and
prediction results that are obtained from the behavior-monitoring data items in each of the other intervals,
the diagnosis-result prediction unit specifies the certain interval
in which a difference between the prediction result that is obtained from the behavior-monitoring data items in the predetermined time period and the prediction result that is obtained from the behavior-monitoring data items in each of the other intervals is equal to or more than a predetermined value, or
in which differences between the prediction results that are obtained from the behavior-monitoring data items in the predetermined time period and the prediction results that are obtained from the behavior-monitoring data items in each of the other intervals are each equal to or more than the predetermined value, and
the information processing device further includes
a driving-behavior specifying unit that specifies driving behaviors of the user in the certain interval on the basis of the behavior-monitoring data items in the predetermined time period.

(14)
The information processing device according to Item (13), in which
the driving behaviors include
sudden braking,
sudden acceleration, and
sudden steering.

(15)
The information processing device according to Item (13) or (14), further including
a display-data generation unit that generates a display data item for presenting the driving behaviors in the certain interval.

(16)
The information processing device according to Item (15), in which
the display data item that the display-data generation unit generates includes a display data item for presenting one of the driving behaviors, the one being exhibited a largest number of times in the certain interval.

(17)
The information processing device according to any one of Items (1) to (16), in which
the one sensor is
an acceleration sensor,
a gyroscopic sensor,
a barometric sensor, or
a geomagnetic sensor, or
the plurality of sensors include
the acceleration sensor,
the gyroscopic sensor,
the barometric sensor, and
the geomagnetic sensor.

(18)
An information processing method, including the steps of:
acquiring an output from one sensor or outputs from a plurality of sensors different from each other as behavior-monitoring data items of a user; and
predicting a diagnosis result about one insurance or diagnosis results about a plurality of insurances for the user on the basis of a prediction model calculated in advance by learning for the one insurance or each of the plurality of insurances, and on the basis of the behavior-monitoring data items.

(19)
A program for causing a computer to execute a procedure, the procedure including the steps of:
acquiring an output from one sensor or outputs from a plurality of sensors different from each other as behavior-monitoring data items of a user; and
predicting a diagnosis result about one insurance or diagnosis results about a plurality of insurances for the user on the basis of a prediction model calculated in advance by learning for the one insurance or each of the plurality of insurances, and on the basis of the behavior-monitoring data items.

REFERENCE SIGNS LIST

101 server
112 control unit
121 data-set generation unit
122 learning unit
151 user terminal device
161-1 acceleration sensor
161-2 gyroscopic sensor
161-3 barometric sensor
161-4 geomagnetic sensor
162 control unit
171 behavior-monitoring-data acquisition unit
172 drive-diagnosis-result prediction unit
173 display-data generation unit
211 drive-diagnosis-result prediction unit
212 display-data generation unit
241 prediction-error prediction unit
271 prediction-error prediction unit
301 action recognition unit
331 position measurement unit
361 driving-behavior specifying unit

The invention claimed is:
1. An information processing device, comprising:
a plurality of sensors configured to acquire user position information and user action recognition information, wherein the user position information indicates a user position on a driving path of an automobile, and the user action recognition information indicates a user action;

an action recognition unit configured to recognize a user state based on the acquired user action recognition information, wherein the user state is one of a user walking state, a user driving state, a user cycling state, a user running state, or a user pausing state;

an acquisition unit configured to:
determine each of a first time period and a second time period based on the acquired user position information and the recognized user state, wherein
the recognized user state is the user driving state, and the second time period is subsequent to the first time period;
acquire, between a start of the first time period and an end of the first time period, a plurality of first outputs from the plurality of sensors; and
acquire, between a start of the second time period and an end of the second time period, a plurality of second outputs from the plurality of sensors, wherein
the plurality of first outputs from the plurality of sensors corresponds to a plurality of first user behavior-monitoring data items in the first time period,
the plurality of second outputs from the plurality of sensors corresponds to a plurality of second user behavior-monitoring data items in the second time period,
each of the plurality of first user behavior-monitoring data items and the plurality of second user behavior-monitoring data items is different from the acquired user position information and the acquired user action recognition information, and
each sensor of the plurality of sensors is different;

a diagnosis-result prediction unit configured to predict a plurality of diagnosis results about a plurality of insurances, wherein
each diagnosis result of the plurality of diagnosis results includes a score that indicates user driving information,
the user driving information corresponds to a degree of safe driving for the automobile,
the prediction is based on a prediction model, the plurality of first user behavior-monitoring data items, and the plurality of second user behavior-monitoring data items, and
the prediction model is calculated based on machine learning for each insurance of the plurality of insurances;

a prediction-error prediction unit configured to:
store prediction-error prediction models; and
predict, based on the stored prediction-error prediction models, the plurality of first user behavior-monitoring data items, the plurality of second user behavior-monitoring data items, the first time period, and the second time period, a plurality of errors corresponding to a plurality of results of the prediction of the plurality of diagnosis results about the plurality of insurances, wherein
the plurality of errors includes a plurality of first errors in the first time period and a plurality of second errors in the second time period,
the first time period is greater than the second time period, and
each first error of the plurality of first errors is smaller than each second error of the plurality of second errors; and a display-data generation unit configured to control a display unit to display an insurance comparison screen to compare the plurality of insurances, wherein
the insurance comparison screen includes a set of display data items to compare the plurality of insurances,
the set of display data items includes a first display data item and a second display data item,
the first display data item indicates the plurality of results of the prediction of the plurality of diagnosis results about the plurality of insurances, and
the second display data item indicates one of a plurality of discounts or a plurality of premiums of the plurality of insurances.

2. The information processing device according to claim 1, wherein
the display-data generation unit is further configured to calculate
the plurality of discounts or the plurality of premiums of the plurality of insurances based on the plurality of results of the prediction.

3. The information processing device according to claim 1, wherein each of the plurality of insurances is a telematics insurance.

4. The information processing device according to claim 1, wherein
the prediction-error prediction unit is further configured to calculate
a plurality of confidence factors, based on a result of the plurality of errors, of the plurality of results of the prediction of the plurality of diagnosis results about the plurality of insurances,
the display-data generation unit is further configured to generate the first display data item based on at least one of
the plurality of confidence factors or the plurality of errors of the plurality of results of the prediction.

5. The information processing device according to claim 4, wherein the first display data item includes a third display data item to present
the plurality of results of the prediction with the plurality of confidence factors or the plurality of errors.

6. The information processing device according to claim 4, wherein the first display data item includes a third display data item to
present, based on a determination that one of each of the plurality of confidence factors is equal to or greater than a first value or the plurality of errors is equal to or less than a second value, the plurality of results of the prediction of the plurality of diagnosis results about the plurality of insurances.

7. The information processing device according to claim 1, wherein the acquisition unit is further configured to:
determine the end of the first time period based on the recognized user state; and
acquire the plurality of first user behavior-monitoring data items based on the end of the first time period.

8. The information processing device according to claim 1, wherein the acquisition unit is further configured to determine the start of the first time period and the end of the first time period based on the user position information and the user state.

9. The information processing device according to claim 1, wherein the plurality of first user behavior-monitoring data items includes:
a plurality of third user behavior-monitoring data items in a third time period, and
a plurality of fourth user behavior-monitoring data items in each interval is different from an interval in the second time period,
the plurality of results of the prediction of the plurality of diagnosis results about the plurality of insurances includes:
a plurality of first prediction results obtained from the plurality of third user behavior-monitoring data items in the third time period, and
a plurality of second prediction results obtained from the plurality of fourth user behavior-monitoring data items in each interval different from the interval in the third time period,
the diagnosis-result prediction unit is further configured to specify
the interval in which differences between the plurality of first prediction results and the plurality of second prediction results are each equal to or more than a specific value, and
the information processing device further comprises a driving-behavior specifying unit configured to specify a plurality of user driving behaviors in the interval based on the plurality of third user behavior-monitoring data items in the third time period.

10. The information processing device according to claim 9, wherein the plurality of user driving behaviors include at least one of sudden braking, sudden acceleration, or sudden steering.

11. The information processing device according to claim 9, wherein the display-data generation unit is further configured to display a third display data item to present the plurality of user driving behaviors in the interval.

12. The information processing device according to claim 11, wherein
the third display data item includes a display data item to present a specific user driving behavior of the plurality of user driving behaviors,
the specific user driving behavior is exhibited a specific number of times in the interval,
each user driving behavior of a set of user driving behaviors is exhibited less than the specific number of times,
the plurality of user driving behaviors includes the set of user driving behaviors, and
each user driving behavior of the set of user driving behaviors is different from the specific user driving behavior.

13. The information processing device according to claim 1, wherein
the plurality of sensors includes at least one of an acceleration sensor, a gyroscopic sensor, a barometric sensor, or a geomagnetic sensor.

14. The information processing device according to claim 1, wherein
the diagnosis-result prediction unit is further configured to generate, for each of the plurality of insurances, a learning data item for at least one error of the plurality of errors, and
the learning data item includes a pair of a length of a corresponding driving time period of a user and the at least one error.

15. The information processing device according to claim 1, wherein each error of the plurality of errors comprises an absolute value of a difference between an actual drive diagnosis result and the prediction of a corresponding diagnosis result of the plurality of diagnosis results.

16. An information processing method, comprising:
acquiring, by a plurality of sensors, user position information and user action recognition information, wherein
the user position information indicates a user position on a driving path of an automobile, and
the user action recognition information indicates a user action;
recognizing a user state based on the acquired user action recognition information, wherein the user state is one of a user walking state, a user driving state, a user cycling state, a user running state, or a user pausing state;
determining each of a first time period and a second time period based on the acquired user position information and the recognized user state, wherein
the recognized user state is the user driving state, and
the second time period is subsequent to the first time period;
acquiring, between a start of the first time period and an end of the first time period, a plurality of first outputs from the plurality of sensors;
acquiring, between a start of the second time period and an end of the second time period, a plurality of second outputs from the plurality of sensors, wherein
the plurality of first outputs from the plurality of sensors corresponds to a plurality of first user behavior-monitoring data items in the first time period,
the plurality of second outputs from the plurality of sensors corresponds to a plurality of second user behavior-monitoring data items in the second time period,
each of the plurality of first user behavior-monitoring data items and the plurality of second user behavior-monitoring data items is different from the acquired user position information and the acquired user action recognition information, and
each sensor of the plurality of sensors is different;
predicting a plurality of diagnosis results about a plurality of insurances, wherein
each diagnosis result of the plurality of diagnosis results includes a score that indicates user driving information,
the user driving information corresponds to a degree of safe driving for the automobile,
the prediction is based on a prediction model, the plurality of first user behavior-monitoring data items, and the plurality of second user behavior-monitoring data items, and
the prediction model is calculated based on machine learning for each insurance of the plurality of insurances;
storing prediction-error prediction models;
predicting, based on the stored prediction-error prediction models, the plurality of first user behavior-monitoring data items, the plurality of second user behavior-monitoring data items, the first time period, and the second time period, a plurality of errors corresponding to a plurality of results of the prediction of the plurality of diagnosis results about the plurality of insurances, wherein the plurality of errors includes a plurality of first errors in the first time period and a plurality of second errors in the second time period, the first time period is greater than the second time period, and each first error of the plurality of first errors is smaller than each second error of the plurality of second errors; and controlling a display unit to display an insurance comparison screen to compare the plurality of insurances, wherein the insurance comparison screen includes a set of display data items to compare the plurality of insurances, the set of display data items includes a first display data item and a second display data item, the first display data item indicates the plurality of results of the prediction of the plurality of diagnosis results about the plurality of insurances, and the second display data item indicates one of a plurality of discounts or a plurality of premiums of the plurality of insurances.

17. A non-transitory computer-readable medium having stored thereon, computer-executable instructions which, when executed by a processor, cause the processor to execute operations, the operations comprising:

acquiring, by a plurality of sensors, user position information and user action recognition information, wherein the user position information indicates a user position on a driving path of an automobile, and the user action recognition information indicates a user action;

recognizing a user state based on the acquired user action recognition information, wherein the user state is one of a user walking state, a user driving state, a user cycling state, a user running state, or a user pausing state;

determining each of a first time period and a second time period based on the acquired user position information and the recognized user state, wherein the recognized user state is the user driving state, and the second time period is subsequent to the first time period;

acquiring, between a start of the first time period and an end of the first time period, a plurality of first outputs from the plurality of sensors;

acquiring, between a start of the second time period and an end of the second time period, a plurality of second outputs from the plurality of sensors, wherein the plurality of first outputs from the plurality of sensors corresponds to a plurality of first user behavior-monitoring data items in the first time period, the plurality of second outputs from the plurality of sensors corresponds to a plurality of second user behavior-monitoring data items in the second time period, each of the plurality of first user behavior-monitoring data items and the plurality of second user behavior-monitoring data items is different from the acquired user position information and the acquired user action recognition information, and each sensor of the plurality of sensors is different;

predicting a plurality of diagnosis results about a plurality of insurances, wherein each diagnosis result of the plurality of diagnosis results includes a score that indicates user driving information, the user driving information corresponds to a degree of safe driving for the automobile, the prediction is based on a prediction model, the plurality of first user behavior-monitoring data items, and the plurality of second user behavior-monitoring data items, and the prediction model is calculated based on machine learning for each insurance of the plurality of insurances;

storing prediction-error prediction models;

predicting, based on the stored prediction-error prediction models, the plurality of first user behavior-monitoring data items, the plurality of second user behavior-monitoring data items, the first time period, and the second time period, a plurality of errors corresponding to a plurality of results of the prediction of the plurality of diagnosis results about the plurality of insurances, wherein the plurality of errors includes a plurality of first errors in the first time period and a plurality of second errors in the second time period, the first time period is greater than the second time period, and each first error of the plurality of first errors is smaller than each second error of the plurality of second errors; and controlling a display unit to display an insurance comparison screen to compare the plurality of insurances, wherein the insurance comparison screen includes a set of display data items to compare the plurality of insurances, the set of display data items includes a first display data item and a second display data item, the first display data item indicates the plurality of results of the prediction of the plurality of diagnosis results about the plurality of insurances, and the second display data item indicates one of a plurality of discounts or a plurality of premiums of the plurality of insurances.

* * * * *